(12) United States Patent
Naylor et al.

(10) Patent No.: US 8,633,425 B2
(45) Date of Patent: Jan. 21, 2014

(54) SYSTEMS, METHODS, AND DEVICES FOR STORING, HEATING, AND DISPENSING FLUID

(75) Inventors: David Naylor, Park City, UT (US);
Arthur J. Fillion, Ogden, UT (US);
David Hall, Salt Lake City, UT (US);
Aaron Evans, Queen Creek, AZ (US);
Brad Terry, St. George, UT (US);
Thomas Roe, Homer Glen, IL (US)

(73) Assignee: 417 and 7/8, LLC, Park City, UT (US)

( * ) Notice: Subject to any disclaimer, the term of this patent is extended or adjusted under 35 U.S.C. 154(b) by 242 days.

(21) Appl. No.: 12/843,523

(22) Filed: Jul. 26, 2010

(65) Prior Publication Data

US 2011/0006080 A1     Jan. 13, 2011

Related U.S. Application Data

(63) Continuation-in-part of application No. 12/433,974, filed on May 1, 2009, which is a continuation-in-part of application No. 12/258,240, filed on Oct. 24, 2008, now abandoned, and a continuation-in-part of application No. 12/119,434, filed on May 12, 2008, now Pat. No. 8,258,443, which is a continuation-in-part of application No. 11/835,641, filed on Aug. 8, 2007, now abandoned, which is a continuation-in-part of application No. 11/744,163, filed on May 3, 2007, now abandoned, which is a continuation-in-part of application No. 11/218,156, filed on Sep. 1, 2005, now Pat. No. 7,230,213, said application No. 12/843,523 is a continuation-in-part of application No. 11/422,580, filed on Jun. 6, 2006, now Pat. No. 7,880,121, which is a continuation-in-part of application No. 11/218,156, and a continuation-in-part of application No. 11/344,830, filed on Feb. 1, 2006, now Pat. No. 7,183,524, and a continuation-in-part of application No. 11/218,156, said application No. 12/843,523 is a continuation-in-part of application No. 12/436,905, filed on May 7, 2009, now abandoned, which is a continuation of application No. 12/433,974, which is a continuation-in-part of application No. 12/258,240, and a continuation-in-part of application No. 12/119,434, said application No. 12/258,240 is a continuation-in-part of application No. 11/835,641.

(60) Provisional application No. 60/688,146, filed on Jun. 6, 2005, provisional application No. 60/654,702, filed on Feb. 17, 2005, provisional application No. 60/656,060, filed on Feb. 23, 2005, provisional application No. 60/688,146, filed on Jun. 6, 2005.

(51) Int. Cl.
*H05B 3/34*        (2006.01)

(52) U.S. Cl.
USPC ........................................................ 219/213

(58) Field of Classification Search
USPC ................... 219/213, 386, 387; 222/146.6
See application file for complete search history.

(56) References Cited

U.S. PATENT DOCUMENTS

| | | |
|---|---|---|
| 1,455,297 A | 5/1923 | Hadley |
| 1,486,412 A | 3/1924 | Biddlecom |
| 2,666,840 A | 1/1954 | Poirier |
| 2,745,942 A | 5/1956 | Cohen |
| 3,380,087 A | 4/1968 | Petty et al. |
| 3,417,229 A | 12/1968 | Shomphe |
| 3,438,069 A | 4/1969 | Long |
| 3,510,547 A | 5/1970 | Eisler |
| 3,649,725 A | 3/1972 | Olson |
| 3,659,077 A | 4/1972 | Olson |
| 3,691,343 A | 9/1972 | Norman |
| 3,694,622 A | 9/1972 | Bentley |
| 3,729,614 A | 4/1973 | Martinet |
| 3,812,320 A | 5/1974 | Borgren |
| 3,852,569 A | 12/1974 | Potvin |
| 3,865,825 A | 2/1975 | Boyce |
| 3,881,091 A | 4/1975 | Day |
| 3,897,928 A | 8/1975 | Eisler |
| 3,938,431 A | 2/1976 | Potvin |
| 3,968,348 A | 7/1976 | Stanfiled |
| 3,988,791 A | 11/1976 | Simon |

| | | | |
|---|---|---|---|
| 4,000,815 A | 1/1977 | Wingbro et al. | |
| 4,060,710 A | 11/1977 | Reuter | |
| 4,091,266 A | 5/1978 | Ito | |
| 4,238,105 A | 12/1980 | West | |
| 4,244,411 A | 1/1981 | Karlstrom et al. | |
| 4,250,398 A | 2/1981 | Ellis | |
| 4,303,074 A | 12/1981 | Bender | |
| 4,316,080 A | 2/1982 | Wroblewski | |
| 4,401,880 A | 8/1983 | Eizenhoefer | |
| 4,423,694 A | 1/1984 | Senneville | |
| 4,457,491 A | 7/1984 | Dudman | |
| 4,485,297 A | 11/1984 | Grise et al. | |
| 4,542,282 A | 9/1985 | Brasky | |
| 4,607,154 A | 8/1986 | Mills | |
| 4,625,394 A | 12/1986 | Kemnitz | |
| 4,773,105 A | 9/1988 | Toyoshima | |
| 4,810,859 A | 3/1989 | Ababtawi | |
| 4,832,881 A | 5/1989 | Arnold | |
| 4,855,573 A | 8/1989 | Vercillo | |
| 4,899,031 A | 2/1990 | Dyer | |
| 4,935,602 A * | 6/1990 | Bravo | 392/458 |
| 4,967,057 A | 10/1990 | Bayless | |
| 5,181,006 A | 1/1993 | Shafe | |
| 5,198,063 A | 3/1993 | Howard | |
| 5,371,340 A | 12/1994 | Stanfield | |
| 5,397,875 A | 3/1995 | Bechtold | |
| 5,451,747 A | 9/1995 | Sullivan | |
| 5,550,350 A | 8/1996 | Barnes | |
| 5,590,478 A | 1/1997 | Furness | |
| 5,591,365 A | 1/1997 | Shields | |
| 5,614,292 A | 3/1997 | Saylor | |
| 5,669,221 A * | 9/1997 | LeBleu et al. | 62/92 |
| 5,780,367 A | 7/1998 | Handwerker | |
| 5,824,996 A | 10/1998 | Kochman | |
| 5,827,050 A | 10/1998 | Price | |
| 5,830,809 A | 11/1998 | Howard | |
| 5,854,470 A | 12/1998 | Silva | |
| 5,974,820 A | 11/1999 | Boyd | |
| 5,986,243 A | 11/1999 | Campf | |
| 5,990,454 A | 11/1999 | Westerberg | |
| 5,994,669 A | 11/1999 | McCall | |
| 6,051,811 A | 4/2000 | Hardison | |
| 6,051,812 A | 4/2000 | Walker | |
| 6,057,530 A | 5/2000 | Gurevich | |
| 6,160,246 A | 12/2000 | Rock et al. | |
| 6,180,929 B1 | 1/2001 | Pearce | |
| 6,184,496 B1 | 2/2001 | Pearce | |
| 6,189,487 B1 | 2/2001 | Owen | |
| 6,211,493 B1 | 4/2001 | Bouman | |
| 6,222,160 B1 | 4/2001 | Remke | |
| 6,245,400 B1 | 6/2001 | Tzeng | |
| 6,279,856 B1 | 8/2001 | Rutherford | |
| 6,294,761 B1 | 9/2001 | Diedrich | |
| 6,294,768 B1 | 9/2001 | Liebich | |
| 6,303,905 B1 | 10/2001 | Chiles | |
| 6,330,986 B1 | 12/2001 | Rutherford | |
| 6,330,988 B1 | 12/2001 | Liu | |
| 6,392,209 B1 | 5/2002 | Oppitz | |
| 6,426,488 B2 | 7/2002 | Schielke | |
| 6,426,489 B1 | 7/2002 | Elsasser | |
| 6,432,336 B1 | 8/2002 | Mercuri | |
| 6,452,138 B1 | 9/2002 | Kochman | |
| 6,482,520 B1 | 11/2002 | Tzeng | |
| 6,483,087 B2 | 11/2002 | Gardner | |
| 6,503,626 B1 | 1/2003 | Norley | |
| 6,614,992 B2 | 9/2003 | Schmitt | |
| 6,631,603 B2 | 10/2003 | Zornes | |
| 6,657,170 B2 | 12/2003 | Clothier | |
| 6,664,520 B2 * | 12/2003 | Clothier | 219/634 |
| 6,667,100 B2 | 12/2003 | Rutherford | |
| 6,673,284 B2 | 1/2004 | Mercuri | |
| 6,673,289 B2 | 1/2004 | Reynolds | |
| 6,740,381 B2 | 5/2004 | Day | |
| 6,746,768 B2 | 6/2004 | Greinke | |
| 6,782,640 B2 | 8/2004 | Westin | |
| 6,797,251 B1 | 9/2004 | Bennett | |
| 6,841,250 B2 | 1/2005 | Tzeng | |
| 6,848,200 B1 | 2/2005 | Westin | |
| 6,855,915 B2 | 2/2005 | Gehring | |
| 6,886,233 B2 | 5/2005 | Rutherford | |
| 6,897,417 B1 | 5/2005 | Usselman | |
| 6,931,756 B2 * | 8/2005 | Morgan et al. | 34/202 |
| 6,943,320 B1 | 9/2005 | Bavett | |
| 6,982,874 B2 | 1/2006 | Smalc | |
| 7,049,559 B2 | 5/2006 | Ishii | |
| 7,108,055 B2 | 9/2006 | Krassowski | |
| 7,161,809 B2 | 1/2007 | Ford | |
| 7,166,912 B2 | 1/2007 | Tzeng | |
| 7,183,524 B2 | 2/2007 | Naylor | |
| 7,186,309 B2 | 3/2007 | Mercuri | |
| 7,230,213 B2 | 6/2007 | Naylor | |
| 7,232,601 B2 | 6/2007 | Mercuri | |
| 7,393,577 B2 | 7/2008 | Day | |
| 7,393,587 B2 | 7/2008 | Krassowski | |
| 7,975,879 B2 * | 7/2011 | Groesbeck | 222/146.6 |
| 2001/0031350 A1 | 10/2001 | Day et al. | |
| 2002/0069603 A1 | 6/2002 | Zornes | |
| 2002/0164483 A1 | 11/2002 | Mercuri | |
| 2003/0046831 A1 | 3/2003 | Westin | |
| 2003/0080114 A1 | 5/2003 | Harashima | |
| 2003/0085215 A1 | 5/2003 | Rix | |
| 2003/0097763 A1 * | 5/2003 | Morgan et al. | 34/468 |
| 2003/0154736 A1 * | 8/2003 | Lloyd et al. | 62/291 |
| 2004/0004066 A1 | 1/2004 | Evans | |
| 2004/0025784 A1 * | 2/2004 | Kawamura et al. | 117/200 |
| 2004/0035853 A1 | 2/2004 | Pais | |
| 2004/0221529 A1 | 11/2004 | Zornes | |
| 2005/0074593 A1 | 4/2005 | Day et al. | |
| 2005/0160620 A1 * | 7/2005 | Morgan et al. | 34/469 |
| 2006/0191902 A1 | 8/2006 | Naylor | |
| 2006/0191903 A1 | 8/2006 | Naylor et al. | |
| 2006/0289000 A1 | 12/2006 | Naylor | |
| 2006/0289468 A1 | 12/2006 | Siebert et al. | |
| 2007/0181561 A1 | 8/2007 | Turletes | |
| 2007/0262073 A1 | 11/2007 | Naylor | |
| 2008/0277417 A1 * | 11/2008 | Groesbeck | 222/105 |
| 2011/0174802 A1 | 7/2011 | Naylor | |
| 2011/0266287 A1 * | 11/2011 | Groesbeck | 220/592.01 |
| 2012/0328274 A1 | 12/2012 | Naylor | |

FOREIGN PATENT DOCUMENTS

| | | |
|---|---|---|
| JP | 04350257 | 12/1992 |
| JP | 2001123667 | 5/2001 |
| JP | 06129095 | 5/2004 |

OTHER PUBLICATIONS

U.S. Appl. No. 12/875,313, filed Sep. 3, 2010, Naylor.
U.S. Appl. No. 12/119,434, Sep. 29, 2010, Office Action.
U.S. Appl. No. 12/119,434, Mar. 3, 2011, Notice of Allowance.
U.S. Appl. No. 11/422,580, filed Sep. 1, 2005 Naylor.
U.S. Appl. No. 11/744,163, filed May 3, 2007, Naylor.
U.S. Appl. No. 11/835,641, filed Aug. 8, 2007, Naylor.
U.S. Appl. No. 12/119,434, filed May 12, 2008, Caterina.
U.S. Appl. No. 12/212,529, filed Sep. 17, 2008, Caterina.
U.S. Appl. No. 12/258,240, filed Oct. 24, 2008, Caterina.
U.S. Appl. No. 12/258,249, filed Oct. 24, 2008, Naylor.
U.S. Appl. No. 12/260,021, filed Oct. 28, 2008, Naylor.
U.S. Appl. No. 12/264,460, filed Nov. 4, 2008, Naylor.
U.S. Appl. No. 12/264,469, filed Nov. 4, 2008, Naylor.
U.S. Appl. No. 12/264,480, filed Nov. 4, 2008, Naylor.
U.S. Appl. No. 12/264,493, filed Nov. 4, 2008, Naylor.
U.S. Appl. No. 12/436,905, filed May 7, 2009, Caterina.
"Thawzall Heater" http://www.themachinecompany.com/faq.htm.
"Q Foil Performance" http://www.rotabolt.com.html/qfoil__1.html.
"Q Foil Technology" http://www.rotabolt.com.html/qfoil.html.
"Q Foil Product Features" http://www.rotabolt.com.html/qfoil__2.html.
"Thawzall Product Selection" http://www.themachinecompany.com/products.htm.
"Ground Heaters S3000" http://www.groundheaters.com/s3000.htm.
"How it Works" http://www.groundheaters.com/how__it__works.htm.

"FP Parallel Constant Watt Heating Cable" Thermon Manufacturing Co.
"SCS Concrete Curing Blankets" http://www.scsincorporated.com/curingblankets.htm.
"Mauritzon Concrete Curing Blankets" http://www.mauritzononline.com.concretecure.html.
"Concrete-Curing-Blankets.Com" http://concrete-curing-blankets.com.
"Janell Concrete Curing Methods" http://www.janell.com/engineering_data.html.
"GrafTech Material Safety Data Sheet" May 17, 2005.
Concrete Curing Technology, Inc. "Instructions for Use of Pad".
"Electrical Floor Heating", portion of catalog from Heating Catalog, http://www.wattsradiant.com.
"The Future Looks Radiant", Full Line Radiant Catalong, http://www.wattsradiant.com 2007.
"Hotmesh", various pages from website, http://www.worldscientificdevelopment.com/hotmesh/motivation.html.
"GO Polymers" http://www.gopolymers.com/index.php?module-abs.
Julian Norley and Gary Chen "GrafTech High Performance, Lightweight Graphite Heat Sinks/Spreaders" IEEE 2002.
GRAFOIL Flexible Graphite "Typical Grafoil Sheet Properties".
"Springfield Wire Inc." http://www.springfield-wire.com/category.cfm?Category=21.
"Graftech" http://www.graftech.com.
Graftech International "Dramatically Improve Your Radiant Floor Heating Performance," copyright 2008, Graftech International Holdings, Inc.
Office Action dated Jan. 25, 2006 cited in related Patent No. 7,230,213.
Office Action dated Aug. 28, 2006 cited in related Patent No. 7,230,213.
Notice of Allowance dated Feb. 7, 2007 cited in related Patent No. 7,230,213.
Office Action dated Jun. 22, 2006 cited in related Patent No. 7,183,524.
Notice of Allowance dated Nov. 29, 2006 cited in related Patent No. 7,183,524.
Office Action dated Mar. 15, 2007 cited in related U.S. Appl. No. 11/422,580.
Office Action dated Jul. 27, 2007 cited in related U.S. Appl. No. 11/422,580.
Office Action dated Dec. 10, 2008 cited in U.S. Appl. No. 11/422,580.
International Search Report from PCT/US05/37414.
Written Opinion from PCT/US05/37414.
International Preliminary Report on Patentability from PCT/US05/37414.
International Search Report from PCT/US06/04437.
Written Opinion from PCT/US06/04437.
International Preliminary Report on Patentability from PCT/US06/04437.
International Search Report from PCT/US08/62481.
Written Opinion from PCT/US08/62481.
International Preliminary Report on Patentability from PCT/US08/62481.
International Search Report from PCT/US08/62479.
Written Opinion from PCT/US08/62479.
International Preliminary Report on Patentability from PCT/US08/62479.
International Search Report from PCT/US09/43443.
Notice of Allowance dated Nov. 16, 2009 cited in related U.S. Appl. No. 11/422,580.
Office Action dated Mar. 8, 2010 from U.S. Appl. No. 12/264,469.
Office Action dated Mar. 5, 2010 from U.S. Appl. No. 12/264,493.
Office Action dated Mar. 5, 2010 from U.S. Appl. No. 12/260,021.
Office Action dated Sep. 29, 2010 from U.S. Appl. No. 12/119,434.
Office Action dated Sep. 1, 2010 from U.S. Appl. No. 11/835,641.
U.S. Appl. No. 12/258,249, Mar. 7, 2012, Office Action.
U.S. Appl. No. 12/875,305, Mar. 8, 2012, Office Action.
U.S. Appl. No. 12/258,240, Mar. 14, 2012, Office Action.
U.S. Appl. No. 12/264,480, Mar. 14, 2012, Office Action.
U.S. Appl. No. 12/119,434, Jun. 14, 2011, Notice of Allowance.
U.S. Appl. No. 12/212,529, Sep. 23, 2011, Office Action.
U.S. Appl. No. 12/119,434, Oct. 26, 2011, Notice of Allowance.
U.S. Appl. No. 12/119,434, Mar. 14, 2012, Notice of Allowance.
U.S. Appl. No. 13/607,531, filed Sep. 7, 2012, Naylor.
U.S. Appl. No. 12/119,434, May 29, 2012, Notice of Allowance.
U.S. Appl. No. 12/433,974, Sep. 17, 2012, Office Action.
U.S. Appl. No. 12/212,529, May 11, 2012, Final Office Action.
U.S. Appl. No. 12/264,460, Aug. 20, 2012, Office Action.

* cited by examiner

*Primary Examiner* — Nathan Ha

(74) *Attorney, Agent, or Firm* — Workman Nydegger

(57) ABSTRACT

A heating unit for use in heating a fluid storage and dispensing system includes a wall module and a lid module. The modules include cover layers. Each module may include a heating component disposed between the cover layers and which is configured to convert electrical energy to heat energy and to distribute the heat energy. The heating component includes a heat generating element for converting electrical current to heat energy and a heat spreading element comprising carbon thermally coupled to the heat generating element. The modules may further include a thermal insulation layer. The modules may also include a receiving power connector electrically connected to the heat generating element.

5 Claims, 8 Drawing Sheets

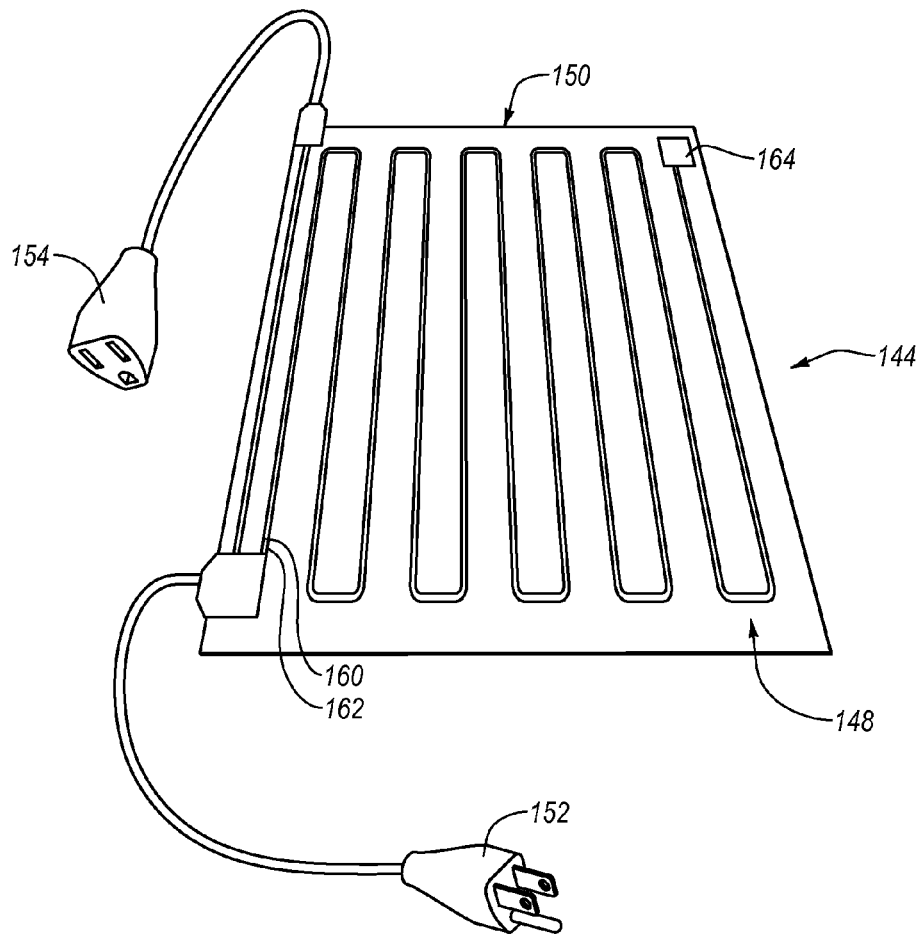
*Fig. 6*
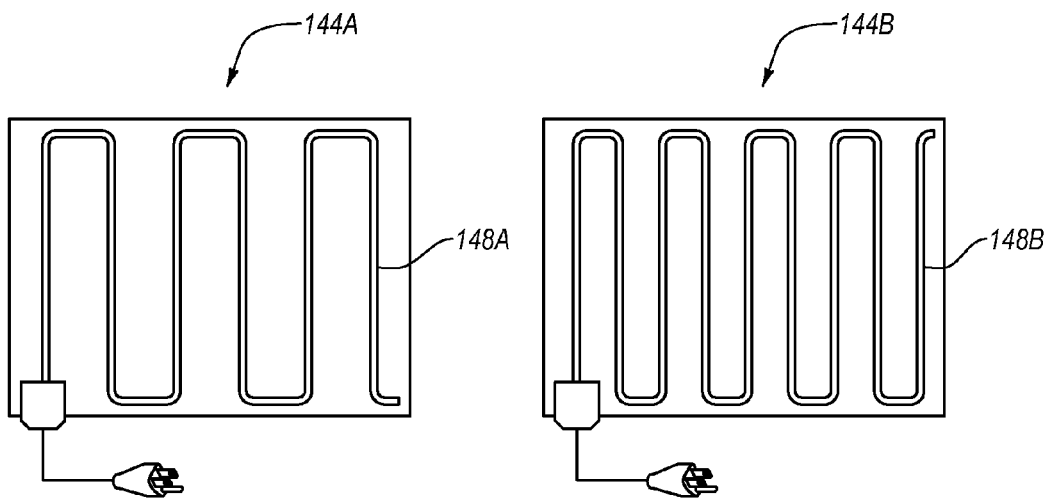
*Fig. 7A*          *Fig. 7B*

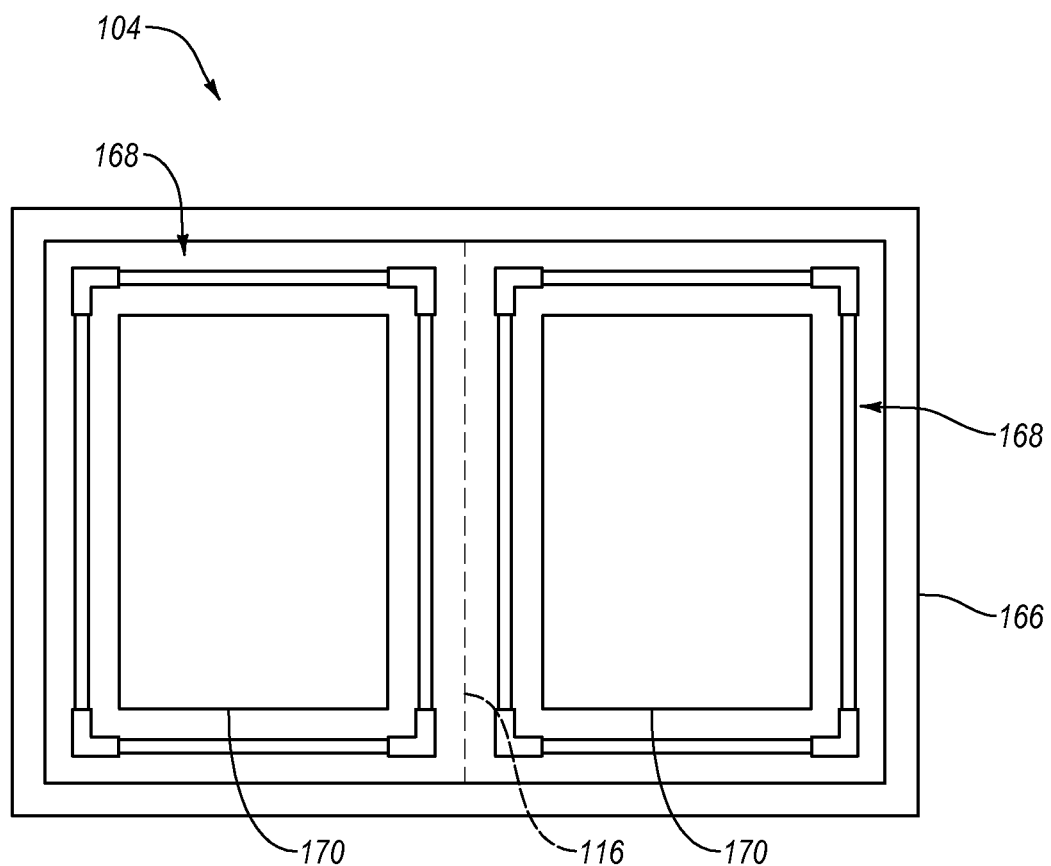
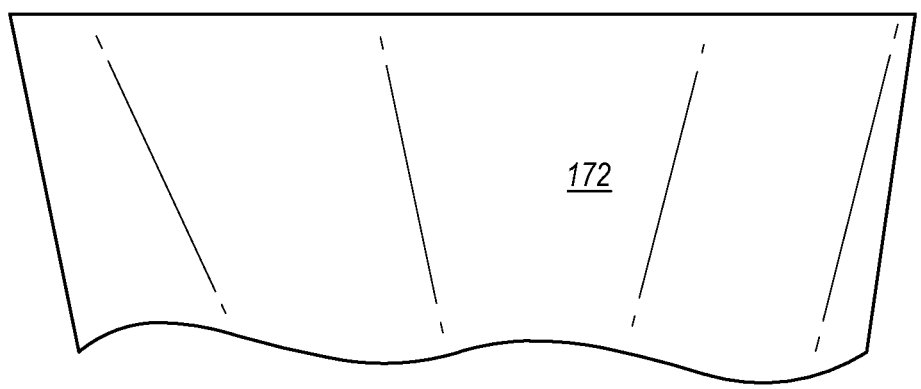
Fig. 8

SYSTEMS, METHODS, AND DEVICES FOR STORING, HEATING, AND DISPENSING FLUID

CROSS-REFERENCE TO RELATED APPLICATIONS

This application is a continuation-in-part of co-pending U.S. application Ser. No. 12/433,974, filed May 1, 2009, entitled PALLET WARMER HEATING UNIT, which is a continuation-in-part of U.S. patent application Ser. No. 12/258,240, filed Oct. 24, 2008, now abandoned entitled HEATING UNIT FOR WARMING PALLETS, and U.S. patent application Ser. No. 12/119,434, filed May 12, 2008, now U.S. Pat. No. 8,258,443 entitled HEATING UNIT FOR WARMING PALLETS, each of which is a continuation-in-part of U.S. application Ser. No. 11/835,641, filed Aug. 8, 2007, now abandoned entitled GROUNDED MODULAR HEATED COVER, which is a continuation-in-part of U.S. patent application Ser. No. 11/744,163, filed May 3, 2007, now abandoned entitled MODULAR HEATED COVER, which is a continuation-in-part of U.S. patent application Ser. No. 11/218,156, filed Sep. 1, 2005, now U.S. Pat. No. 7,230,213, issued Jun. 12, 2007, entitled MODULAR HEATED COVER. This application is also a continuation-in-part of U.S. patent application Ser. No. 11/422,580, filed Jun. 6, 2006, now U.S. Pat. No. 7,880,121 entitled A RADIANT HEATING APPARATUS, which claims priority to and the benefit of U.S. Provisional Patent Application No. 60/688,146, filed Jun. 6, 2005, entitled LAMINATE HEATING APPARATUS. U.S. patent application Ser. No. 11/422,580 is also a continuation-in-part of U.S. patent application Ser. No. 11/218,156, filed Sep. 1, 2005, now U.S. Pat. No. 7,230,213, issued Jun. 12, 2007, entitled MODULAR HEATED COVER, which claims priority to and the benefit of each of: (a) U.S. Provisional Patent Application No. 60/654,702, filed Feb. 17, 2005, entitled A MODULAR ACTIVELY HEATED THERMAL COVER; (b) U.S. Provisional Patent Application No. 60/656,060, filed Feb. 23, 2005, entitled A MODULAR ACTIVELY HEATED THERMAL COVER; and (c) U.S. Provisional Patent Application No. 60/688,146, filed Jun. 6, 2005, entitled LAMINATE HEATING APPARATUS. U.S. patent application Ser. No. 11/422,580 is also a continuation-in-part of U.S. patent application Ser. No. 11,344,830, filed Feb. 1, 2006, now U.S. Pat. No. 7,183,524, issued Feb. 27, 2007, entitled MODULAR HEATED COVER, which claims priority to and the benefit of each of: (a) U.S. Provisional Patent Application No. 60/654,702, filed Feb. 17, 2005, entitled A MODULAR ACTIVELY HEATED THERMAL COVER; (b) U.S. Provisional Patent Application No. 60/656,060, filed Feb. 23, 2005, entitled A MODULAR ACTIVELY HEATED THERMAL COVER; and (c) U.S. Provisional Patent Application No. 60/688,146, filed Jun. 6, 2005, entitled LAMINATE HEATING APPARATUS. U.S. patent application Ser. No. 11,344,830 is also a continuation-in-part of U.S. patent application Ser. No. 11/218,156, filed Sep. 1, 2005, now U.S. Pat. No. 7,230,213, issued on Jun. 12, 2007, entitled MODULAR HEATED COVER. This application is also a continuation-in-part of U.S. patent application Ser. No. 12/436,905, May 7, 2009, now abandoned entitled UNIT FOR WARMING PALLETS OF MATERIAL, which is a continuation of U.S. patent application Ser. No. 12/433,974, filed May 1, 2009, entitled PALLET WARMER HEATING UNIT, which is a continuation-in-part of U.S. patent application Ser. No. 12/258,240, filed Oct. 24, 2008, now abandoned entitled HEATING UNIT FOR WARMING PALLETS, and U.S. patent application Ser. No. 12/119,434, filed May 12, 2008, now U.S. Pat. No. 8,258,443 entitled HEATING UNIT FOR WARMING PALLETS. Each of the preceding United States patents and patent applications is incorporated herein in its entirety by this reference.

BACKGROUND

1. Technical Field

The present invention relates to warming applications. More specifically, the invention relates to methods, systems, and devices for warming fluid storage and dispensing systems and fluid stored therein or delivered therewith.

2. The Relevant Technology

In recent years, environmental concerns have been receiving significantly more attention, and various governmental agencies have responded by implementing stringent regulations to reduce or prevent pollution. Many of these regulations and concerns are directed towards vehicle emissions. For example, medium and heavy-duty trucks, especially diesel trucks, and large agricultural equipment, such as tractors, produce large amounts of pollutants that are believed to be harmful to the environment. Thus, some environmental regulations are requiring that such vehicles now be made to produce fewer harmful pollutants or, for existing vehicles, be retrofitted with systems that reduce the amount of pollutants released into the environment.

In order to comply with these environmental regulations, most diesel engine manufacturers are using Selective Catalytic Reduction (SCR) technology. The SCR system uses diesel exhaust fluid to convert nitrogen oxides ("NOx") emissions into nitrogen and water vapor, which are two harmless and natural components. NOx are an exhaust element that contributes to acid rain, smog and greenhouse gas levels. This environmental pollutant is a byproduct of the high temperature diesel combustion process. The hotter the combustion temperature, the more NOx is created.

The Selective Catalytic Reduction system is an emissions-reduction technology using Diesel Exhaust Fluid (DEF) to deliver near-zero emissions of NOx. SCR reduces NOx emissions to extremely minute levels, while at the same time delivering improved fuel economy and reliability. SCR technology does not change the design or operation of the basic engine. Rather, SCR is a simple after treatment system that converts NOx in the exhaust stream into harmless gases. Modern diesels already use exhaust after treatment systems, called diesel particulate filters, to control emissions of other pollutants, such as soot (also known as particulate matter or PM). SCR works by injecting diesel exhaust fluid into the exhaust stream only as required. The diesel exhaust fluid works with the heat of the exhaust and a catalyst to convert NOx into nitrogen and water vapor.

Diesel exhaust fluid is one of the key elements of the Selective Catalytic Reduction process used by many vehicle engines to reduce the amount of harmful pollutants being introduced into the environment. Diesel exhaust fluid is a nontoxic solution of about 67.5% purified water and 32.5% ultra pure automotive grade urea. Diesel exhaust fluid is not a fuel or fuel additive. Instead, when injected into the exhaust stream and passed over a catalyst, Diesel exhaust fluid helps convert NOx into nitrogen gas and water vapor, which are harmless to the environment.

While SCR technology can be employed to help vehicles meet the increasingly more stringent environmental regulation, there are some challenges that are associated with this technology. Vehicles equipped with SCR systems have a tank for holding the diesel exhaust fluid used in the SCR system. For over the road vehicles, such as semi-trucks, these tanks can be filled at a filling station, such as a gas station, that provides diesel exhaust fluid. In other situations, such as agricultural settings, a diesel exhaust fluid supply may be located on a farm for refilling farm tractors, for example. In either case, the diesel exhaust fluid supply typically includes a fluid tank for storing the diesel exhaust fluid and a dispensing system for delivering the fluid from the storage tank to the vehicle. One challenge arises when temperatures drop. For instance, during cold winter months, temperatures may drop far enough that the diesel exhaust fluid freezes. In such a circumstance, the diesel exhaust fluid would not be able to be transferred from the storage tank to the vehicle tank. As a result, the vehicle may be operated without diesel exhaust fluid, which would lead to pollutants being introduced into the environment as well as decreased engine horsepower.

Thus, there is a need for systems, methods, and devices that can prevent the diesel exhaust fluid from becoming frozen, and thereby ensure that vehicles' SCR systems can be supplied with the necessary diesel exhaust fluid even in very low temperature situations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The present invention relates to heating applications, and particularly to heating units for heating fluid storage and dispensing systems to prevent freezing of fluid stored therein and delivered therewith. In one embodiment, the heating unit includes a wall module that forms the walls of the heating unit. The wall module can be selectively coupled around fluid system, including a fluid storage tank and a fluid dispensing system using one or more fasteners. The one or more fasteners can include grommets, snaps, straps, clips, cords, rope, or a combination thereof. The wall module can be configured to generate heat and evenly spread the heat over a surface thereof so that the fluid system can be evenly warmed to prevent freezing of the fluid within the fluid system.

In one exemplary embodiment, a heating unit is provided for use in warming a fluid system and fluid disposed therein. The fluid system can include a fluid storage tank and a fluid dispensing system mounted to the fluid storage tank. The heating unit used to warm the fluid system can include a wall frame, a wall module, and a lid module. The wall frame can be configured to be positioned adjacent the fluid storage tank whereby the wall frame generally surrounds the fluid dispensing system. The wall module can be configured for arrangement to at least partially define an interior space in which the fluid storage tank and the wall frame may be disposed.

The wall module can include a first cover layer and a second cover layer coupled to the first cover layer. The wall module can also include a heating component positioned between the first and second cover layers, the heating component having a heat generating element for generating heat energy and a heat spreading element for substantially uniformly spreading the heat energy over the wall module. The heat spreading element can comprise graphite. The wall module can further include an insulation layer positioned respectively at one side of the heating component and configured to direct heat energy toward the interior space defined by the wall module.

The lid module can be configured to rest upon the wall module to cover and retain heat within the interior space of the heating unit, whereby the fluid storage tank, the fluid dispensing system, and the fluid may be warmed. At least a portion of the lid module can be configured to be used as a door to access the fluid storage tank or the fluid dispensing system disposed within the heating unit. In some instances, the lid module comprises first and second panels pivotally coupled to one another by a hinge to enable at least one of the first and second panels to pivot between a closed position and an open position.

In some embodiments, the heating component of the wall module comprises a receiving power connector electrically connected to the heat generating element. The receiving power connector can be configured to couple to an electrical power source. Similarly, the heating component can further include an outgoing power connector electrically connected to the heat generating element.

The interior space of the heating unit can be formed when the wall module is selectively secured around at least one of the fluid storage tank and the wall frame. Additionally, the wall module can generally secure the wall frame in place relative to the fluid dispensing system when the wall module is selectively secured around the fluid storage tank and the wall frame.

An alternative embodiment provides a fluid system for storing and dispensing fluid. The fluid system can include a fluid tank adapted to have fluid disposed therein and a fluid dispensing system associated with the fluid tank so that the fluid dispensing system is in fluid communication with fluid disposed in the fluid tank. The system can also include a wall frame adapted to substantially surround the fluid dispensing system;

In addition, the system further includes wall module configured to be arranged to substantially surround the fluid storage tank, the fluid dispensing system, and the wall frame. The wall module comprises a heating component comprising a heat generating element for generating heat energy and a heat spreading element for substantially uniformly spreading the heat energy over a surface of the wall module. The heat spreading element can be thermally isotropic in one plane. The wall module also includes an insulation layer positioned respectively at one side of the heating component and configured to direct heat energy toward the fluid storage tank, the fluid dispensing system, and the wall frame. Also, a lid module is provided that is configured to rest upon the wall module to cover and retain heat the fluid storage tank and the fluid dispensing system so that the fluid within the fluid storage tank may be warmed. The lid module and the wall module can include one or more fasteners for selectively securing the lid module to the wall module and/or selectively securing the wall module around the fluid storage tank and fluid dispensing system. In addition, the lid can include flaps arranged to prevent or inhibit wind from entering into the heating unit. In some embodiments, the wall module can define a window for providing access to the fluid dispensing system. In such embodiments, the lid module can include an access panel for selectively covering the window in the wall module.

In still another embodiment, a method for warming fluid in a fluid system is provided. The fluid system can have a fluid tank for storing fluid and a fluid dispensing system mounted to the fluid tank for dispensing fluid from the fluid tank. The method includes substantially surrounding the sides of the fluid tank and fluid dispensing system with a heating component. The heating component can be configured to convert electrical energy to heat energy and to distribute the heat energy over the fluid tank and fluid dispensing system. The heating component can include a heat generating element for converting electrical current to heat energy and a heat spreading element comprising carbon thermally coupled to the heat generating element. The method further includes substantially surrounding the sides of the fluid tank and fluid dispensing system with an insulation layer, such as closed cell foam, that is adapted to direct the heat energy from the heating component toward the fluid tank and fluid dispensing system. The heating component and the insulation layer can be selectively secured around the fluid tank and fluid dispensing system. Additionally, the method can include substantially covering the fluid tank and fluid dispensing system with a lid having an insulation layer for retaining the heat energy under the lid. The method can also include providing a thermostat configured to regulate an operating temperature of the heating component or to maintain the fluid at a desired temperature.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 illustrates details of a heat spreading element of the heating unit of FIG. 1;

FIGS. 7A and 7B illustrate comparative alternate temperature arrangements for the heating unit of FIG. 1:

FIG. 8 illustrates a partially exploded view of a lid module of the heating unit of FIG. 1.

DETAILED DESCRIPTION

Figure 1:
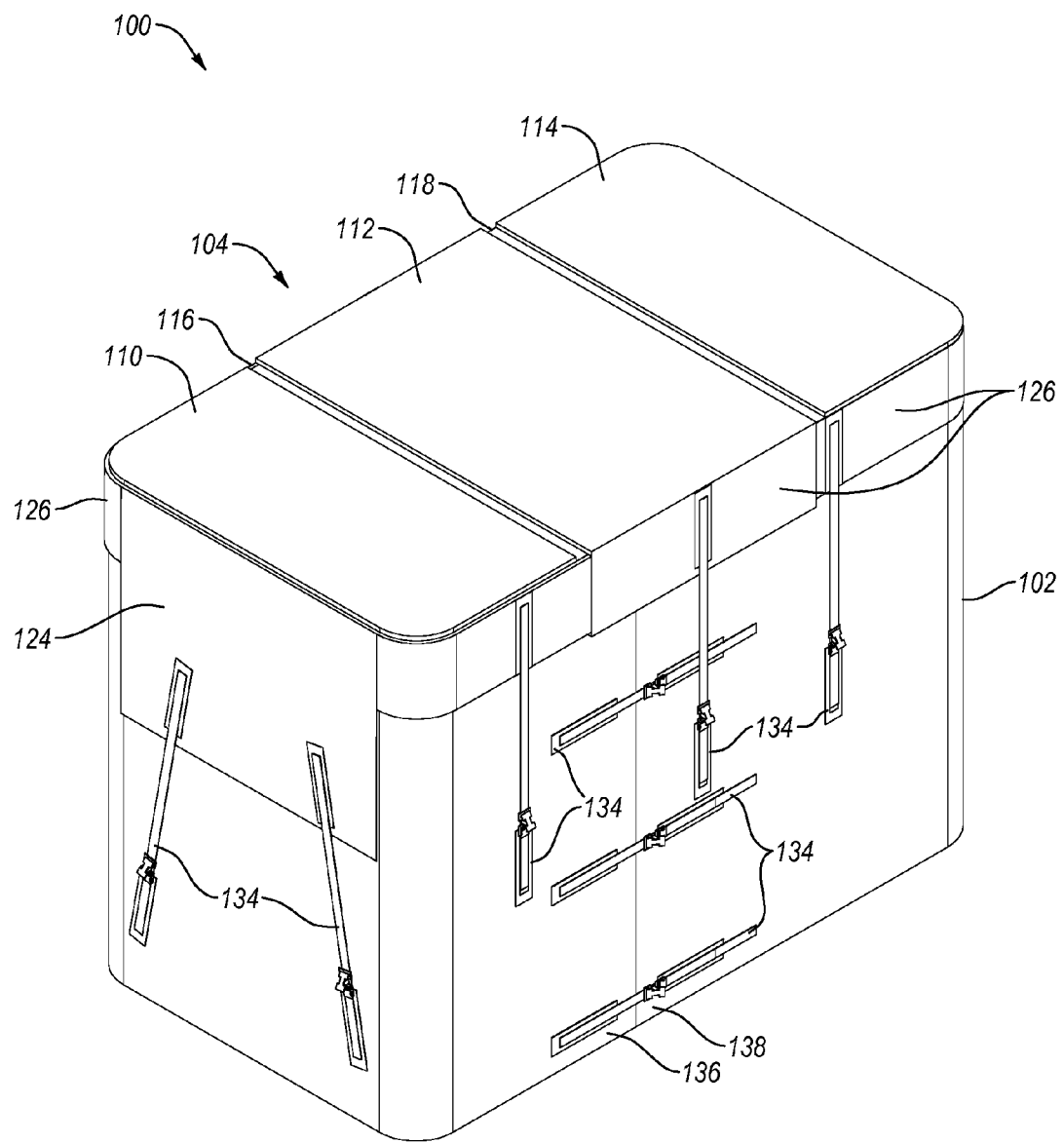
FIG. 1 illustrates a perspective view of a heating unit according to one exemplary embodiment of the present invention, the heating unit being configured as a fluid storage and dispensing system warmer.

The embodiments described herein extend to methods, devices, systems, assemblies, and apparatuses for providing heat to a fluid storage and dispensing system, such as a diesel exhaust fluid storage and dispensing system. Such are configured to, for example, reliably, evenly, and efficiently warm the fluid storage and dispensing system components and the fluid associated therewith to maintain the fluid above a predetermined temperature, such as freezing, and/or prevent to the components of the fluid system fluid from freezing.

In describing and claiming the present invention, the terms "fluid storage system," "fluid dispensing system," "fluid storage and dispensing system," and the like (individually or collectively referred to hereinafter as "fluid system"), are utilized herein to generically describe a variety of different devices or systems that may store, retain, transport, convey, delivery, dispense, etc, a fluid, gas, slurry, or other material or mixture. By way of non-limiting example, fluid systems may include tanks, reservoirs, hoses, pumps, nozzles, spouts, and the like. The term "fluid system" and similar terms may, however, refer to other types of devices and industries, and is not necessarily limited to devices used to store or deliver fluids, nor to devices usable in a particular industry.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Further, numerical data may also be expressed or presented herein. It is to be understood that such numerical data is used merely to illustrate example operative embodiments. Moreover, numerical data provided in range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. Furthermore, such numerical values and ranges are intended to be non-limiting examples of example embodiments, and should not be construed as required for all embodiments unless explicitly recited as such in the claims.

Reference will now be made to the drawings to describe various aspects of exemplary embodiments of the invention. It is understood that the drawings are diagrammatic and schematic representations of such exemplary embodiments, and are not limiting of the present invention, nor are any particular elements to be considered essential for all embodiments or that elements be assembled or manufactured in any particular order or manner. No inference should therefore be drawn from the drawings as to the necessity of any element.

In the following description, numerous specific details are set forth in order to provide a thorough understanding of the present invention. It will be obvious, however, to one of ordinary skill in the art that the present invention may be practiced without these specific details. In other cases, well known aspects of fluid systems and heating units, as well as methods and general manufacturing techniques are not described in detail herein in order to avoid unnecessarily obscuring the novel aspects of the present invention.

FIGS. 1-9 and the following discussion are intended to provide a brief general description of exemplary devices in which embodiments of the invention may be implemented. While a heating unit for warming a diesel exhaust fluid storage and dispensing system is described below, this is but one single example, and embodiments of the invention may be implemented with other types of systems. Accordingly, throughout the specification and claims, the term "fluid" is intended to apply broadly to any type of material that can be stored and conveyed through a dispensing system, such as a system including hoses, pumps, and the like as described herein. Furthermore, while the embodiments described below are directed to a fluid system that includes both a storage tank and a dispensing system, the present invention may be employed to warm a fluid system that includes only a fluid tank or only a dispensing system. For instance, the present invention may be configured to provide heat to a fluid tank on a vehicle, such as a diesel exhaust fluid tank on a tractor. In other embodiments in which a fluid system includes both a storage tank and a dispensing system, the present invention may be configured to provide heat to either the storage tank or the dispensing system.

FIGS. 1-9 thus illustrate one example of a heating unit 100 implementing some aspects of the present invention. The heating unit in FIGS. 1-9 is only one example of a suitable system for warming fluid in a fluid system and is not intended to suggest any limitation as to the scope of use or functionality of an embodiment of the invention. Neither should the unit be interpreted as having any dependency or requirement relating to any one or combination of components illustrated in the unit.

Some embodiments may include a heating unit configured to substantially cover the entire outer perimeter of a fluid system, including substantially the full height of a fluid storage system as well as an associated fluid system dispensing system. The heating unit may include a heating element that provides heat and spreads the heat over at least portions of the surface of the heating unit. The heating unit may also include an insulation layer to prevent heat from being lost to an environment external to an enclosed area formed by the heating unit.

Figure 2:
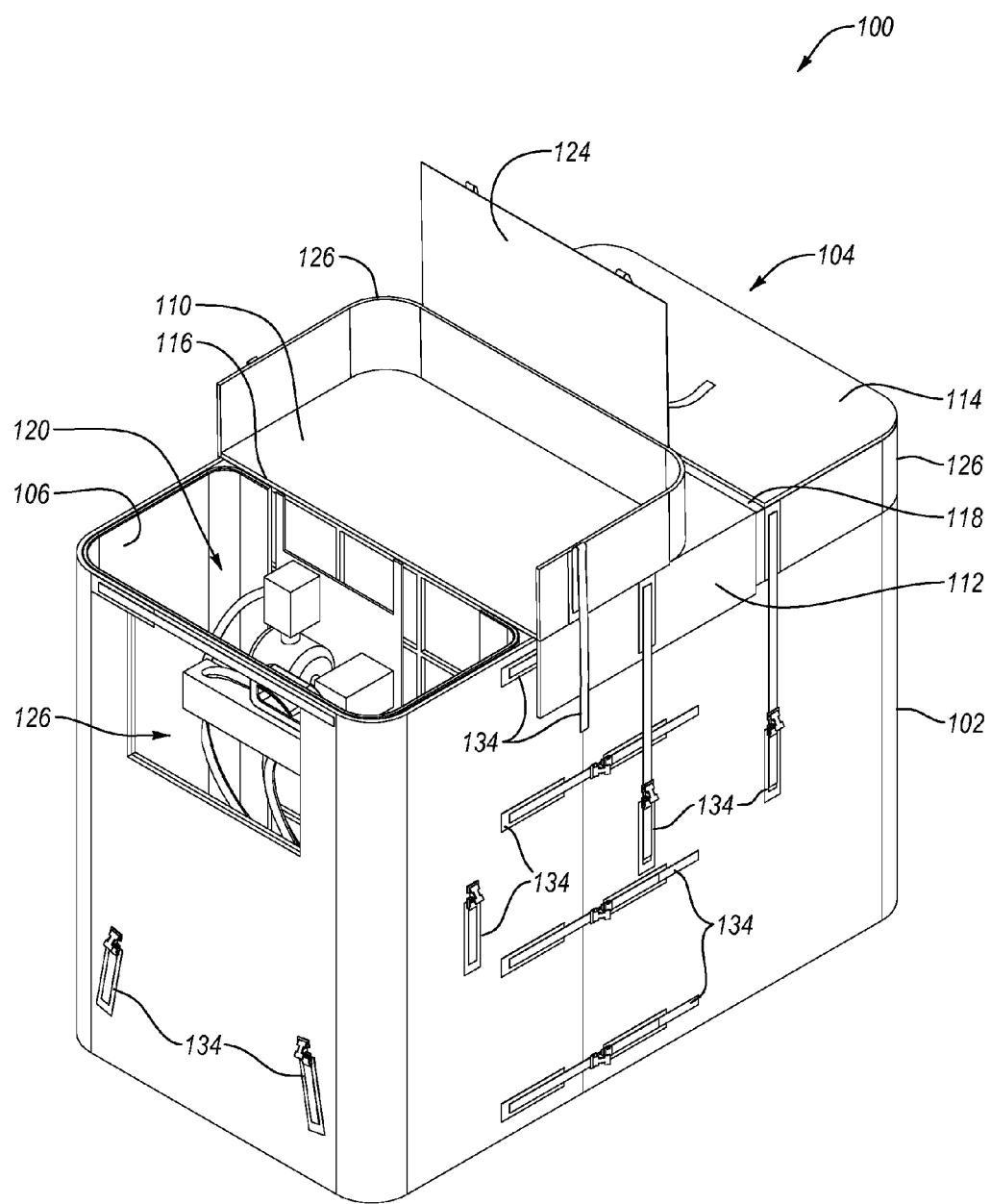
FIG. 2 is a perspective view of the heating unit of FIG. 1 illustrating the lid of the heating unit being opened to provide access to the fluid dispensing system disposed therein.
Figure 3:
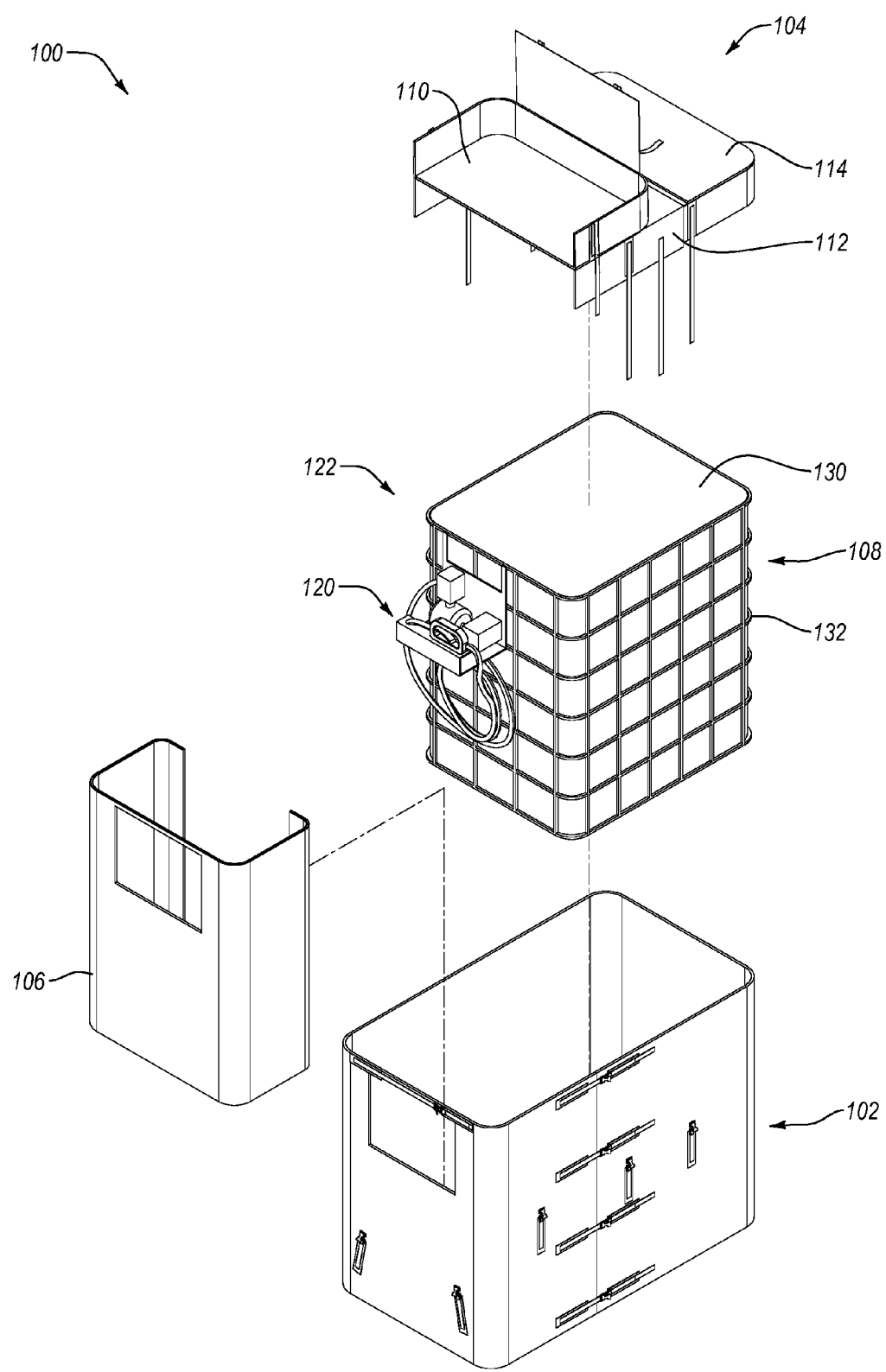
FIG. 3 is an exploded perspective view of the heating unit of FIG. 1 and an associated fluid storage and dispensing system.

FIGS. 1 through 3 illustrate perspective views of an exemplary embodiment of a heating unit 100 according to the present invention. Heating unit 100 is generally configured as a fluid system warmer. The term "fluid system warmer," as used herein, broadly refers to a heating unit that is configured to substantially receive, surround, and/or enclose a fluid system, including storage and/or dispensing devices, and fluid stored therein and/or delivered therewith. Thus, heating unit 100 may also be referred to herein as fluid system warmer 100. In the illustrated embodiment, for example, when assembled around a fluid system, heating unit 100 is generally box shaped so that it can substantially enclose a fluid system that is to be warmed by heating unit 100.

As seen in FIGS. 1 through 3, heating unit 100 includes a wall module 102, a lid or lid module 104, and a wall frame 106 that define an interior space in which a fluid system 108 can be disposed. Wall module 102 can be relatively flexible so that is can be wrapped around the outer vertical walls of wall frame 102 and fluid system 108. Lid 104 can be supported by wall module 102, wall frame 106, and fluid system 108. With heating unit 100 assembled as shown in FIGS. 1-3, fluid system 108 is substantially enclosed by heating unit 100 such that heating unit 100 extends around the sides and over the top of fluid system 108.

Heating unit 100 is configured to provide heat to fluid system 108 and fluid stored therein or delivered therewith. Furthermore, when heating unit 100 is closed as shown in FIG. 1, heating unit 100 is configured to retain within the interior space formed by wall module 102 and lid 104 heat generated by heating unit 100. By retaining the generated heat within the interior space, heating unit 100 is able to warm or maintain the fluid in fluid system 108 at a desired temperature.

FIG. 2 illustrates one manner of accessing fluid system 108 when heating unit 100 is used to warm fluid system 108. Fluid system 108 can be accessed by way of lid 104. In the illustrated embodiment, lid 104 includes a first panel 110, a second panel 112, and a third panel 114. First and third panels 110 and 114 function as doors or hatches which can be selectively opened and closed to facilitate access to fluid system 108 within heating unit 100. First and third panels 110 and 114 pivot about hinges 116 and 118, respectively. Each of first and third panels 110 and 114 can be partially or entirely opened to allow for access to fluid system 108.

For instance, as shown in FIG. 2, first panel 110 can be pivoted 180° about hinge 116 to a fully opened position. For example, first panel 110 can be pivoted about hinge 116 so that first panel 110 is folded back and rests upon second panel 112. Opening first panel 110 as shown in FIG. 2 can allow for convenient access to fluid dispensing system 120. Third panel 114 can be opened in a similar manner to that of first panel 110. In particular, third panel 114 can be pivoted 180° about hinge 118 to a fully opened position. For example, third panel 114 can be pivoted about hinge 118 so that third panel 114 is folded back and rests upon second panel 112. Opening third panel 114 in this manner can allow for convenient access to fluid storage system 122.

In addition to opening individual panels, multiple panels can be opened at the same time. For instance, each of panels 110 and 114 can be opened at the same time in the manner described above so as to provide access to both fluid storage system 122 and fluid dispensing system 120. Similarly, two adjacent panels can be opened together. By way of example, panels 110 and 112 can be opened together to provide greater access to fluid storage system 122 and/or fluid dispensing system 120. More particularly, panels 110 and 112 can be pivoted about hinge 118 so as to uncover fluid storage system 122 and fluid dispensing system 120. Likewise, panels 112 and 114 can be pivoted about hinge 116 to uncover fluid storage system 122 and/or fluid dispensing system 120.

As used herein, the term "hinge" is intended to broadly encompass any suitable structure that allows for panels 110, 112, and/or 114 to pivot open as described above. For instance, hinges 116 and 118 may be mechanical hinges that are specifically designed to allow for pivoting of adjacent components. Alternatively, lid 104 may simply be formed with creases, seams, or the like that allow for the above-described pivoting of the various panels of lid 104.

Rather than gaining access to fluid dispensing system 120 or fluid storage system 122 of fluid system 108 by opening panels 110, 112, and/or 114, lid 104 may optionally include one or more access panels 124. In the illustrated embodiment, access panel 124 extends from first panel 110 down the outside of wall module 102. When access to fluid system 108 is desired, access panel 124 can be opened, such as by lifting access panel 124 and folding it on top if first panel 110. Lifting access panel 124 reveals a window 126 formed in wall module 102 and wall frame 106. With access panel 124 lifted, access to fluid system 108 can be achieved through window 126. Because window 126 is positioned on the side of heating unit 100 and since window 126 is smaller than the openings created when first or third panels 110 and 114 are opened, less heat is able to escape from the interior formed within heating unit 100. As a result, the fluid within fluid system 108 stays warmer without requiring heating unit 100 to generate significant amounts of additional heat. As will be appreciated, the inclusion of window 126 and access panel 124 are optional since the panels of lid 104 provide access inside of heating element 100

Lid 104 may include flaps 128 that extend from the peripheral edges of lid 104. Flaps 128 can be integrally formed with lid 104 or can be secured to lid 104. In one embodiment, flaps 128 extend about six inched over wall module 102. Flaps 128 can assist in retaining heat within the interior space of heating unit 100. Likewise, flaps 128 can limit or prevent wind or air from entering the interior space of heating unit 100.

With continued reference to FIGS. 1 and 2, particular attention is now directed to FIG. 3, in which an exploded view of heating unit 100 and fluid system 108 is illustrated. As depicted in FIG. 3, fluid system 108 includes a fluid dispensing system 120 and a fluid storage system 122. In the illustrated embodiment, fluid storage system 122 includes a fluid tank or reservoir 130 that is adapted to have fluid disposed therein. Tank 130 is a positioned within a cage 132 that includes a support base or floor (not shown) upon which tank 130 can rest. Cage 132 can provide additional structural support to tank 130 as well as facilitating more convenient transportation of tank 130. It will be understood by one of ordinary skill in the art that cage 132 is not a necessary component of fluid system 108. Rather, cage 132 can be used to provide additional advantages, such as convenience in transportation of fluid system 108.

Furthermore, cage 132 can also be used for mounting additional components of fluid system 108 thereon. For instance, as shown in FIG. 3, fluid dispensing system 120 can be mounted on cage 132. Fluid dispensing system 120 can include various conveyance devices, such as hoses, pipes, spouts, nozzles, pumps, and the like. Thus, fluid dispensing system 120 can be used to convey fluid stored within tank 130 to a destination, such as a vehicle tank for example. In embodiments where fluid system 108 does not include cage 132, fluid dispensing system 120 can be mounted or attached to tank 130.

As seen in FIG. 3, heating unit 100 is a modular heating unit including, in this example, wall module 102, lid module 104, and wall frame 106. Wall frame 106 is designed to act as a wall around fluid dispensing system 120. More specifically, wall frame 106 is formed in a generally squared C-shape so that fluid dispensing system 120 can fit through the opening in the C-shape, as depicted in FIG. 2. Thus, wall frame 106 acts as an extension of cage 132 or tank 130 so that fluid dispensing system 120 is enclosed by structurally sound materials.

Wall module 102 is designed to be wrapped or otherwise positioned around fluid system 108 and wall frame 106, thereby surrounding the vertical sides of fluid system 108 and wall frame 106 with wall module 102. Wall frame 106 and cage 132 (or tank 130 when case 132 is on present) act as a support structure for wall module 102. Wall module 102 can be relatively flexible so that it can be rolled or folded when not in use. As a result of its flexibility, wall module 102 can be wrapped around fluid systems 108 and/or wall frames 106 of varying sizes and shapes. Regardless of the particular design of fluid system 108 or wall frame 106, wall module 102 can be formed flexible enough to conform to the overall shape of the particular fluid system 108 or wall module 106. In any case, fluid system 108 and wall module 106 can act as a framework for wall module 102. In some embodiments, wall module 102 may have structural framing incorporated therein. For instance, wall module may have one or more internal frames that provide support to wall module 102. Examples of support frames that could be incorporated into wall module 102 are disclosed in U.S. patent application Ser. No. 12/433,974, filed May 1, 2009, and entitled PALLET WARMER HEATING UNIT, the disclosure of which is incorporated herein by reference in it entirety.

In the illustrated embodiment, wall module 102 and lid 104 include fasteners 134. Fasteners 134 can be used to securely hold wall module 102 around wall frame 106 and fluid system 108. For instance, fasteners 134 positioned vertically along opposing ends 136 and 138 of wall module 102 can be used to couple opposing ends 136 and 138 together when wall module 102 is positioned around wall frame 106 and fluid system 108. Additional fasteners 134 positioned along the edges of lid 104 and around wall module 102 can be used to couple lid 104 to wall module 102.

In some embodiments, fasteners 134 may be selectively coupleable to allow a wall module 102 to be selectively secured around fluid system 108 and wall frame 106, or to allow one or more of lid panels 110, 112, and 114 to be selectively secured to wall module 102 or selectively detached from wall module 102 so that the lid can be opened. For instance, in the embodiment illustrated in FIGS. 1-3, fasteners 134 include clips secured to wall module 102 and lid module 104 via straps. Alternatively, fasteners 134 may include any other suitable devices that allow for selective coupling. For instance, fasteners 134 may include grommets that can be selectively secured using one or more adjustable bungee cords. Likewise, fasteners 134 may includes hook and loop type fasteners, such as VELCRO. For more permanent securement, fasteners 134 may be fastened by zip ties, rope, string, wire, or other appropriate fasteners.

Figure 4:
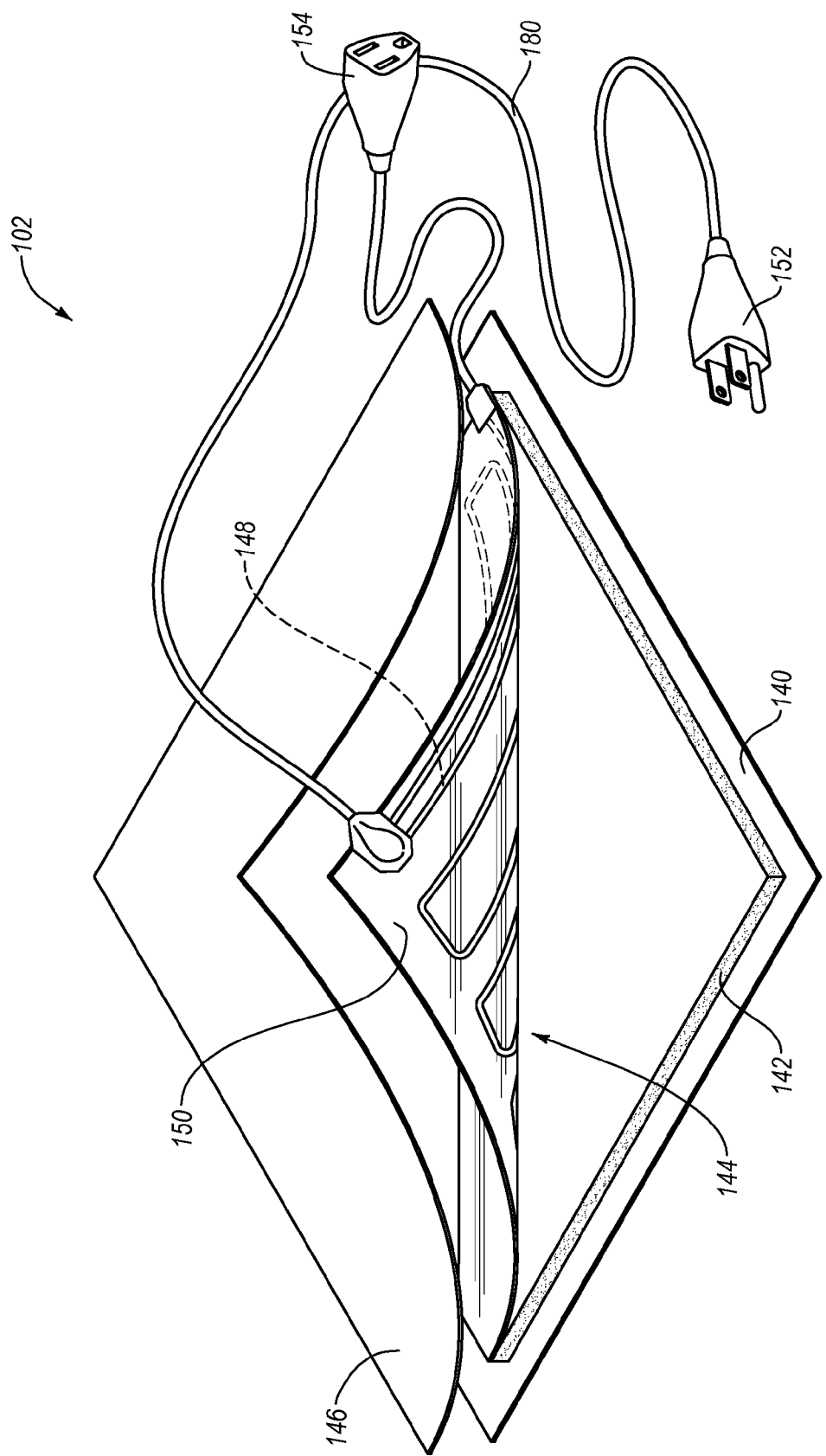
FIG. 4 illustrates a partially exploded view of a wall module of the heating unit of FIG. 1.
Figure 5:
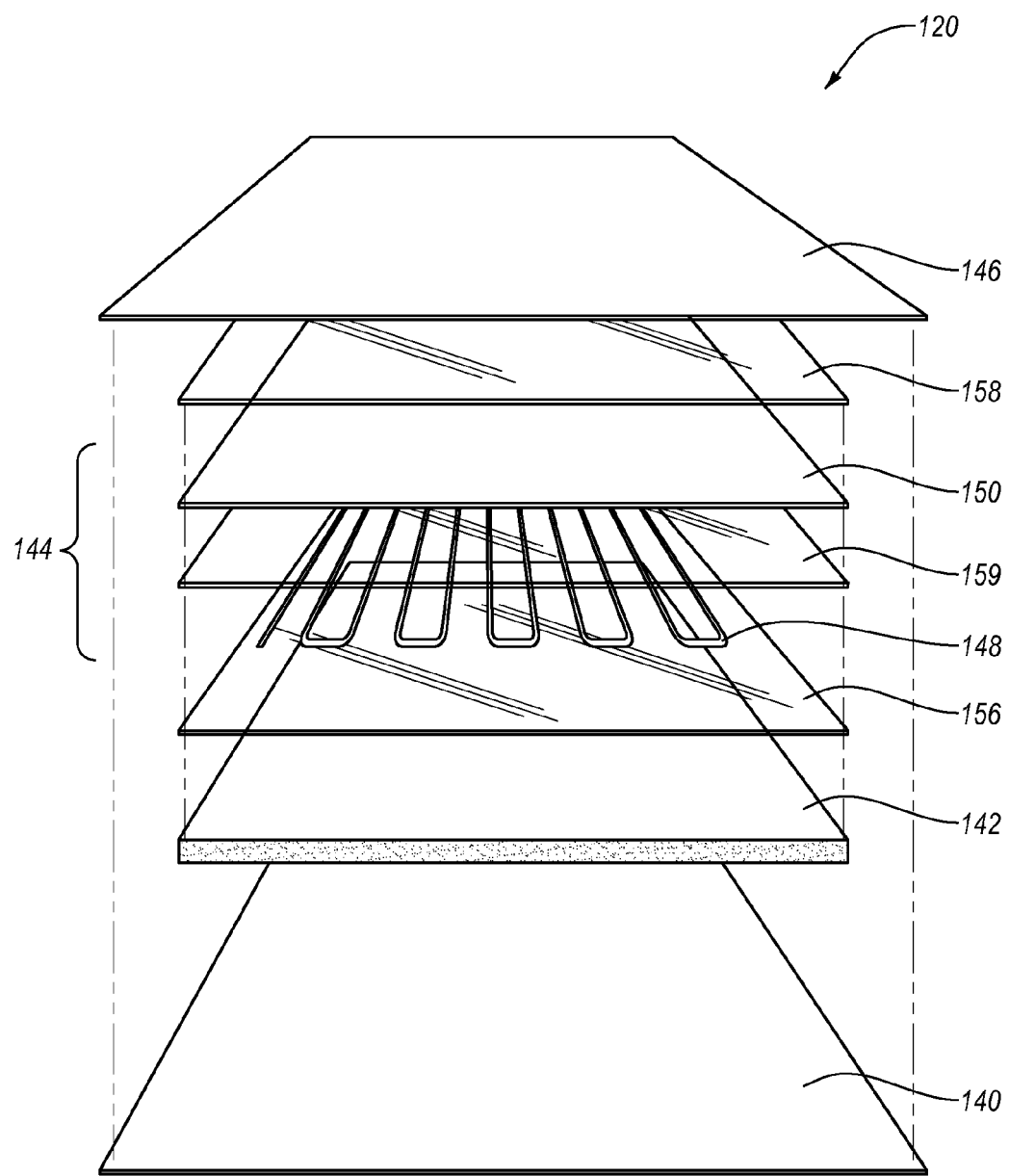
FIG. 5 illustrates an exploded view of the wall module of the heating unit of FIG. 1, showing the construction of various elements of the heating unit.

Attention is now directed to FIGS. 4 and 5, which illustrate exploded views of wall module 102 with exemplary components and the construction of wall module 102, including materials used to assemble wall module 102. FIG. 4 illustrates a partially exploded view depicting the flexible nature of wall module 102 that includes a first cover layer 140, an insulation layer 142, a heating element 144, and a second cover layer 146. In some embodiments, heating element 144 includes a heat generating strip 148 and a heat spreading element 150, each of which will be described in greater detail below. Heating unit 100 further includes an incoming electrical connector 152 and, optionally, an outgoing electrical connector 154. While the example illustrated in FIG. 4 is illustrated as partially exploded, some finished embodiments may be manufactured such that insulation layer 142 and heating element 144 may be sealed between first cover layer 140 and second cover layer 146. Sealing processes and details will be discussed in more detail below.

FIG. 5 illustrates a fully exploded view of wall module 102 so as to more clearly illustrate the individual components of wall module 102. As illustrated in FIG. 5, first and second cover layers 140 and 146 are generally planar sheets of material that are disposed on opposing sides of the internal components of wall module 102. During construction of wall module 102, first cover layer 140 is positioned as illustrated in FIG. 5. Next, insulation layer 142 is positioned on top of first cover layer 140 and heating element 144 is then positioned on top of insulation layer 142. Finally, second cover layer 146 is positioned on top of heating element 144. With the various components of wall module 102 so positioned, the peripheral edges of first and second layers 102 and 108 can be joined, sealed, or otherwise closed.

As described herein, the various components of wall module 102 are flexible such that wall module 102 can be wrapped around objects, such as fluid system 108 and wall frame 106, and rolled or folded up when not in use. In order to ensure that wall module 102 and its various components retain their shape and their positions relative to one another, the various components of wall module 102 can be attached to one another. For example, the various components of wall module 102 can be glued, bonded, or otherwise held together. Attaching the components of wall module 102 together can help to prevent the components from moving relative to one another within wall module 102. Nevertheless, wall module 102 can be formed without the components thereof being attached together. Rather, the components can be placed next to one another is the desired arrangement and generally held in place simply by the configuration of wall module 102.

In embodiments where the components of wall module 102 are attached together, attaching heating element 144 to insulation layer 142 ensures that heating element 144 will stay positioned next to insulation layer 142 and will not sag, bunch, or otherwise move within wall module 102. In particular, because insulation layer 142 is formed of a stiffer material than heating element 144, attaching heating element 144 to insulation layer 142 provides stiffness to heating element 144. While insulation layer 142 is referred to as being formed of a "stiffer" material, it will be appreciated that in some embodiments insulation layer 142 may still be flexible such that it can be wrapped around fluids system 108 and wall frame 106, for example. Similarly, heat generating strip 148 and heat spreading element 150 can be attached to one another to ensure that heat generating strip 148 is properly positioned on heat spreading element 150, even after wall module 102 is rolled, folded, and used several times. Likewise, heating element 144 and/or insulation layer 142 can be attached to first and/or second cover layers 140 and 146 to prevent the internal components of wall module 102 from moving within first and second cover layers 140 and 146.

FIG. 5 illustrates one exemplary embodiment in which various components of wall module 102 are attached together. For convenience of illustration, incoming electrical connector 152 and outgoing electrical connector 154 are omitted from FIG. 5. In the embodiment illustrated in FIG. 5, there are three interfaces between the heating unit components for attachment between the components. As used herein, an attachment interface is a surface where two or more components of wall module 102 are attached together. The first attachment interface 156 is between the top surface of insulation layer 142 and the bottom surface of heating element 144. As noted herein, heating element 144 includes a heat generating strip 148 mounted on a heat spreading element 150. In the illustrated embodiment, the heat generating strip 148 is mounted on the bottom surface of heat spreading element 150 such that heat generating strip 148 is positioned between heating spreading element 150 and insulation layer 142. Attachment interface 156 is therefore between the top surface of insulation layer 142 and the bottom surface of heat spreading element 150, with heat generating element 148 mounted on heat spreading element 150 therebetween.

The second attachment interface 158 is between the top surface of heat spreading element 150 and the bottom surface of second cover layer 146. The third attachment interface 159 is between the bottom surface of heat spreading element 150 and the top surface of heat generating element 148. In other embodiments, there is only the first, second, or third attachment interface 156, 158, or 159. Still in other embodiments, there are additional attachment interfaces, such as between the bottom surface of insulation layer 142 and the top surface of first cover layer 140.

Attachment interfaces 156, 158, 159 can be created by attaching the above identified components of wall module 102 in any suitable manner so that the components maintain their relative positions one to another. For instance, the components may be attached to one other with an adhesive (e.g., glue), a mechanical fastener (e.g., clips, staples), a chemical bonding agent, a tape, or the like. Additionally, each component may be partially or entirely attached to adjacent components. For instance, an adhesive may be used to attach entire adjacent surfaces together. Alternatively, tape may be used in discreet locations to attach adjacent components together.

In one exemplary embodiment, attachment interfaces 156, 158, and 159 are created using an adhesive between the components of wall module 102. One such adhesive suitable for attaching together the components of wall module 102 is 30-NF FASTBOND™ available from 3M located in St. Paul, Minn. FASTBOND™ is a non-flammable, heat resistant, polychloroprene based adhesive. In order to properly adhere the components of wall module 102 together with FASTBOND™, the interfacing surfaces should be clean and dry. With the surfaces prepared, a uniform coat of FASTBOND™ is applied to both interfacing surfaces. After applying, the FASTBOND™ is allowed to dry completely, which typically takes about 30 minutes. Once the FASTBOND™ on both surfaces is dry, the two FASTBOND™ coated surfaces are joined together.

For example, when attaching insulation layer 142 to heat spreading element 150, a coat of FASTBOND™ is applied to the top surface of insulation layer 142 and the bottom surface of heat spreading element 150 over the top of heat generating strip 148. Once the FASTBOND™ on each surface is dry, heat spreading element 150 is positioned on top of insulation layer 142 and the two layers of FASTBOND™ adhere to one another. The same process can be followed to attach second cover layer 146 to the top surface of heat spreading element 150 or to attach the first cover layer 140 to the bottom surface of insulation layer 142.

In the illustrated embodiment, second cover layer 146 is attached to heating element 144 and heating element 144 is attached to insulation layer 142. Notably, however, insulation layer 142 and heating element 144 can be left unattached from first and/or second cover layers 140 and 146. Not attaching insulation layer 142 and heating element 144 to first and/or second cover layers 140 and 146 provides for flexibility and give in wall module 102 when wall module 102 is folded, rolled, or wrapped around an object. Specifically, wall module 102 is configured to be wrapped around an object such that second cover layer 146 is adjacent the object and first cover layer 140 is positioned away from the object (see FIG. 1 in which first cover layer 140 is showing). When first and/or second cover layers 140 and 146 are not attached to insulation layer 142 and/or heating element 144, first and/or second cover layers 140 and 146 are able to move relative to insulation layer 142 and heating element 144 and stretch as wall module 102 is wrapped around an object. Notably, these are only examples, and other attachment configurations may be used.

The following discussion will now treat additional details and embodiments of the various components of the wall module 102. Referring now to FIG. 6 and as noted above, in some embodiments heating element 144 includes a heat generating strip 148. Heat generating strip 148 may be, for example, an electro-thermal coupling material or resistive element. In some embodiments, heat generating strip 148 may be a copper, copper alloy or other conductor. In one embodiment, the conductor is a network of copper alloy elements configured to generate about 9 W of power per linear foot of heat generating strip 148. This may be achieved by selection of appropriate alloys for heat generating element 148 in combination with selection of appropriate heat generating element wire sizes and circuit configurations. The conductor may convert electrical energy to heat energy, and transfer the heat energy to the surrounding environment. Alternatively, heat generating element 148 may comprise another conductor, such as semiconductors, ceramic conductors, other composite conductors, etc., capable of converting electrical energy to heat energy. Heat generating strip 148 may include one or more layers for electrical insulation, temperature regulation, and ruggedization.

Notably, other heat sources may be used in addition to or as alternatives to heat generating strip 148. For example, some embodiments may include the use of exothermic chemical reactions to generate heat or heating tubes which a heated liquid runs through.

With continuing reference to FIG. 6, heat generating strip 148 is illustrated with two heat generating conductors 160 and 162. One of the two conductors is connected to a first terminal of the incoming electrical connector 152 while the other conductor is connected to a second terminal of the electrical connector 152. The first and second terminals may be connected to electrical sources as appropriate, such as generator supplied AC or DC sources, batteries, power inverters, etc. The two conductors 160 and 162 may be connected at one end to create a closed circuit allowing current to flow through the two conductors to generate heat.

In the example illustrated in FIG. 6, the two conductors are connected through a thermostat 164. In this example, thermostat 164 includes a bi-metal strip based temperature control that disconnects conductors 160 and 162 at a pre-determined temperature. Examples of predetermined temperatures may be 33° F., 60° F., 80° F., 100° F., and 120° F. Notably, these are only examples, and other temperatures may be alternatively used. This can be used to regulate the temperature of heating unit 100 to prevent overheating, or to maintain the temperature at a temperature of about the pre-determined temperature.

Embodiments may be implemented where the temperature is determined by selecting a thermostat 164 with a fixed temperature rating. Other embodiment may be implemented where the temperature setting of the thermostat can be adjusted to a predetermined temperature at manufacturing time. In some embodiments, the thermostat may be user accessible to allow a user to adjust the thermostat settings. While in the example illustrated the thermostat is located at the ends of conductors 160 and 162, it should be appreciated that in other embodiments the thermostat may be placed inline with one of conductors 160 and 162. Additionally, some embodiments may include low voltage control circuitry including temperature control functionality, which controls application of power to conductors 160 and 162 through methods such as pulse width modulation or any other technique to regulate temperature.

It should further be appreciated that embodiments may be implemented where other temperature or current protections are included. For example, embodiments may include magnetic and/or thermal circuit breakers, fuses, semiconductor based over-current protection, ground fault protection, arc fault protection, etc. In some embodiments, these may be located at the ends of conductors 160 and 162 or inline with one or more of conductors 160 and 162 as appropriate.

Additionally, controlling temperature may be accomplished by controlling the density of heat generating element 148. This may be accomplished by controlling spacing between different portions of heat generating element 148 allowing for more or less material used for heat generating element 148 to be included in the heating unit 100. This method may be especially useful when heat generating elements have a constant Wattage output per length of heat generating element. Thus a longer heat generating element 148 provides more heat than a shorter heat generating element 148. FIGS. 7A and 7B illustrate a comparative example where two alternative embodiments are illustrated. Each of the embodiments illustrates a heating element 144 of the same size, but with different heat generating elements densities. The first embodiment illustrates a heating element 144A with a less dense heat generating element 148A, while the second embodiment illustrates a heating element 144B with a more dense heat generating element 148B. In still further embodiments, heating element 144 may have different densities within the same heating element 144. By way of non-limiting example, wall module 102 may have a heating element 144 with a heat generating element 148 that has a certain density near the bottom of wall module 102 and a different density near the top of wall module 102. For instance, heat generating element 148 may be spaced four inches apart on a portion of heating element 144 and 6 inches apart on another portion of heating element 144.

By way of the method described herein, the temperature of the fluid within fluid system 108 can be regulated. In particular, by way of a thermostat or the selection and configuration of the heating unit components, such as the spacing of heat generating element 148, the temperature of the fluid within fluid system 108 can be maintained at a desired temperature or within a desired temperature range. For example, when diesel exhaust fluid is stored in fluid system 108, it is important to maintain the diesel exhaust fluid above its freezing temperature of about 12° F. If the temperature of the diesel exhaust fluid is allowed to drop below about 12° F., the diesel exhaust fluid could freeze inside of fluid system 108, which would prevent fluid dispensing system 120 from conveying the diesel exhaust fluid to a vehicle, for example. Additionally, freezing of fluids within pipes and hoses, such as may be included in fluid dispensing system 120, can cause the pipes or hoses to crack or otherwise fails, thereby requiring replacement or repair. In other applications, the fluid may have a specific range of operating temperature for optimal performance and/or may spoil if allowed outside of this temperature range. Thus, the thermostats, configuration of the heating unit components, and the temperature protection mechanisms described herein enable the fluid within fluid system 108 to be maintained within a desired temperature range or above a critical temperature. By way of example, some desired temperatures may be 13° F., 34° F., 45° F., 60° F., 80° F., and 110° F. Similarly, exemplary temperature ranges may be, for example, between 13° F. and 50° F., between 65° F. and 110° F., between 72° F. and 90° F., and between 75° F. and 85° F.

Returning attention to FIG. 6, as noted above, electrical heating element 144 may further include a heat spreading element 150. In general terms, the heat spreading element 150 is a layer of material capable of drawing heat from heat generating element 148 and distributing the heat energy away from heat generating element 148. Specifically, heat spreading element 150 may comprise a metallic foil, wire mesh, carbon mesh, graphite, a composite material, or other material.

Heat spreading element 150 in one embodiment is an electrically conductive material comprising carbon. Graphite is one example of an electrically conductive material comprising carbon. However, other suitable materials may include carbon-based powders, carbon fiber structures, or carbon composites. Those of skill in the art will recognize that material comprising carbon may further comprise other elements, whether they represent impurities or additives to provide the material with particular additional features. Materials comprising carbon may be suitable so long as they have sufficient thermal conductivity to act as a heat-spreading element. In one embodiment, the material comprising carbon comprises sufficient electrical conductivity to act as a ground connection, as will be discussed in more detail below. The heat spreading element 150 may further comprise a carbon derivative, or a carbon allotrope.

One example of a material suitable for a heat spreading element 150 is a graphite-epoxy composite. The in-plane thermal conductivity of a graphite-epoxy composite material is approximately 370 watts per meter per Kelvin, while the out of plane thermal conductivity of the same material is 6.5 watts per meter per Kelvin. The thermal anisotropy of the graphite/epoxy composite material is then 57, meaning that heat is conducted 57 times more readily in the plane of the material than through the thickness of the material. This thermal anisotropy allows the heat to be readily spread out from the surface, which in turn allows for more heat to be drawn out of heating element 148.

Heat spreading element 150 may comprise a material that is thermally isotropic in one plane. The thermally isotropic material may distribute the heat energy more evenly and more efficiently. One such material suitable for forming heat spreading element 150 is GRAFOIL® available from Graftech Inc. located in Lakewood, Ohio. In particular, GRAFOIL® is a flexible graphite sheet material made by taking particulate graphite flake and processing it through an intercalculation process using mineral acids. The flake is heated to volatilize the acids and expand the flake to many times its original size. The result is a sheet material that typically exceeds 98% carbon by weight. The sheets are flexible, lightweight, compressibly resilient, chemically inert, fire safe, and stable under load and temperature. The sheet material typically includes one or more laminate sheets that provide structural integrity for the graphite sheet.

Due to its crystalline structure, GRAFOIL® is significantly more thermally conductive in the plane of the sheet than through the plane of the sheet. This superior thermal conductivity in the plane of the sheet allows temperatures to quickly reach equilibrium across the breadth of the sheet.

Typically, the GRAFOIL® will have no binder, resulting in a very low density, making the heated cover relatively light while maintaining the desired thermal conductivity properties. For example, the standard density of GRAFOIL® is about 1.12 g/ml. It has been shown that three stacked sheets of 0.030" thick GRAFOIL® C have similar thermal coupling performance to a 0.035" sheet of cold rolled steel, while weighing about 60% less than the cold rolled steel sheet.

Another product produced by GrafTech Inc. that is suitable for use as a heat spreading element 150 is EGRAF® SPREADERSHIELD™. The thermal conductivity of the SPREADERSHIELD™ products ranges from 260 to 500 watts per meter per Kelvin within the plane of the material, and that the out of plane (through thickness) thermal conductivity ranges from 6.2 down to 2.7 watts per meter per Kelvin. The thermal anisotropy of the material ranges from 42 to 163. Consequently, a thermally anisotropic planar heat spreading element 150 serves as a conduit for the heat within the plane of heat spreading element 150, and quickly distributes the heat more evenly over a greater surface area than a foil. The efficient planar heat spreading ability of the planar heat spreading element 150 also provides for a higher electrical efficiency, which facilitates the use of conventional power supply voltages such as 120 volts on circuits protected by 20 Amp breakers, instead of less accessible higher voltage power supplies. In some embodiments, heat spreading element 150 is a planar thermal conductor. In certain embodiments, the graphite may be between 1 thousandth of an inch thick and 40 thousandths of an inch thick. This range may be used because within this thickness range the graphite remains pliable and durable enough to withstand repeated rolling and unrolling as the heating unit 100 is unrolled for use and rolled up for storage.

Heat spreading element 150 may comprise a flexible thermal conductor. In certain embodiments, heat spreading element 150 is formed in strips along the length of heat generating element 148. In alternative embodiments, heat spreading element 150 may comprise a contiguous layer.

In some embodiments, heat spreading element 150 may include an insulating element formed of a thin plastic layer on both sides of heat spreading element 150. The insulating element may additionally provide structure to the heat spreading material used in heat spreading element 150. For example, the insulating element may be polyethylene terephthalate (PET) in the form of a thin plastic layer applied to both sides of heat-spreading element 150 comprising graphite. Those of skill in the art will appreciate that such a configuration may result in the insulating element lending additional durability to heat-spreading element 150 in addition to providing electrical insulation, such as electrical insulation from the electrical current in heat generating element 148. It should be noted that heating generating element 148 may include its own electrical insulation as well as described above.

In some embodiments, heat spreading element 150 may include a heat conducting liquid such as water, oil, grease, etc.

In certain embodiments, heat generating element 148 is in direct contact with heat spreading element 150 to ensure efficient thermo-coupling. Alternatively, heat spreading element 150 and heat generating element 148 are integrally formed. For example, heat spreading element 150 may be formed or molded around heat generating element 148. Alternatively, heat generating strip 148 and heat spreading element 150 may be adhesively coupled as described above.

Notably, while temperature may be controlled with the use of thermostats as described above, other embodiments may implement other design criteria to control temperature. For example, some embodiments may use appropriate selection of heat spreading element 150 and/or the arrangement of heat generating element 148. Illustratively, the heat retention properties of heat spreading element 150 may be a factor in regulating temperatures at which a heating unit 100 will operate. Further, the density of heat generating element 148 with respect to the size of heating unit 100 or heat spreading element 150 can be used to set the operating temperatures or to regulate temperatures.

Returning once again to FIGS. 4 and 5, FIGS. 4 and 5 illustrate an insulation layer 142. Insulation layer 142 may be used to reflect or direct heat or to prevent heat from exiting in an undesired direction. For example, it may be desirable to have all or most of the generated heat be directed towards a particular surface of the heating unit 100. In the embodiment illustrated in FIGS. 1 through 3, for example, it may be desirable to direct heat towards fluid system 108 while directing heat away from an exterior environment in which fluid system 108 is located. In the example illustrated, it may be desirable to have heat directed towards the side of the heating unit 100 which includes second cover layer 146, while directing heat away from the side that includes first cover layer 140. Insulation layer 142 may be used to accomplish this task. Some exemplary embodiments of heating unit 100 have been implemented where about 95% of heat generated is directed towards a desired surface of the heating unit.

Insulating layer 142 may include a sheet of polystyrene, cotton batting, GORE-TEX®, fiberglass, foam rubber, etc. In certain embodiments, insulation layer 142 may allow a portion of the heat generated by heat generating element 148 to escape through first cover layer 140 if desired. For example, insulation layer 142 may include a plurality of vents to transfer heat to first cover layer 140. In certain embodiments, insulation layer 142 may be integrated with either first cover layer 140 or second cover layer 146. For example, first cover layer 140 may include an insulation fill or batting positioned between two films of nylon.

In some embodiments, first and second cover layers 140 and 146 may comprise a textile fabric. The textile fabric may include natural or synthetic products. For example, first and second cover layers 140 to 146 may comprise burlap, canvas, cotton or other materials. In another example, first and second cover layers 140 to 146 may comprise nylon, vinyl, or other synthetic textile material. First and second cover layers 140 to 146 may comprise a thin sheet of plastic, metal foil, polystyrene, or other materials.

In manufacturing heating unit 100, heating element 144 and insulation layer 142 may be sealed between first and second cover layers 140 and 146. As illustrated in FIGS. 4 and 5, first and second cover layers 140 and 146 extend slightly beyond heating element 144 and insulation layer 142. This allows first and second cover layers 140 and 146 to be sealed, such as by using an adhesive, heat welding, or another other appropriate method or combination of methods.

Lid or lid module 104 can be formed in a similar manner and with similar components as wall module 102. For example, FIG. 8 illustrates a partially exploded view of lid 104. Lid 104 includes a first cover layer 166, two frames 168, internal components 170, and a second cover layer 172. First cover layer 166 is generally rectangular in shape and has two frames 168 laid next to each other on top of first cover layer 166, as shown in FIG. 8. The illustrated embodiment of lid 104 also includes two sets of internal components 170. One set of the internal components 170 is positioned within each of frames 168. With frames 168 and internal components 170 so positioned on first cover layer 166, second cover layer 172 is placed over frames 168 and internal components 170. The edges of first and second cover layers 166, 172 are then coupled, attached, or otherwise secured together to hold frames 168 and internal components 170 therebetween. Additionally, the edges of first and second cover layers 166, 172 can cooperate to form flaps 126 described above. For example, edges of first and second cover layers 166, 172 can be sized so that when the edges are joined together, such as through heat welding, the edges form flaps 126. Alternatively, additional material can be attached to first cover layer 166 and/or second cover layer 172 to form flaps 126.

Furthermore, the area of first and second cover layers 166, 172 between frames 168 can be joined together in a number of different ways to form hinges 116 and 118. For example, two walls or panels can be connected together to form the hinge therebetween. For instance, first and second panels 110 and 112 can be joined together to form hinge 116. Alternatively, a module can be formed and then an operation can be performed on the module to form the hinge. For example, lid 104 could be formed with two frames 168, internal components 170, and cover layers 166 and 172. Once lid 104 is so formed, an operation could be performed on lid 104 to create hinge 116 or 118. Such operations may include various heat welding operations or other appropriate operations. In some embodiments, for example, lid 104 may have external vinyl coverings which may allow for heat welding and heat seams to be formed in the vinyl. The heat welding and heat seams formed in the vinyl between frames 168 can form hinges 116 and 118. Alternatively, hinges 116 and 118 can be formed of any mechanical hinge, such as those hinges well known in the art. For simplicity, lid 104 illustrated in FIG. 8 only includes two lid panels and one hinge, rather than three lid panels and two hinges as shown in FIGS. 1 through 3. It will be understood that lid 104 can include one or more panels and one or more hinges without departing from the scope of the present invention.

The size and shape of lid 104 can be selected to correspond to the shape and size of the interior space formed by wall module 102 when wall module 102 is positioned around fluid system 108 and wall frame 106. Additionally, the internal components 170 of lid 104 can include all of the heating functionality described in connection with heating element 144 of wall module 102. Alternatively, internal components 170 may only include insulating and or heat spreading functionality. In particular, some embodiments of lid 104 may be implemented where internal components 170 include heating elements having heat generating elements and heat spreading elements similar to those described above in connection with wall module 102. Alternatively, various elements may not be included in lid 104, including heat generating elements and/or heat spreading element.

Figure 9:
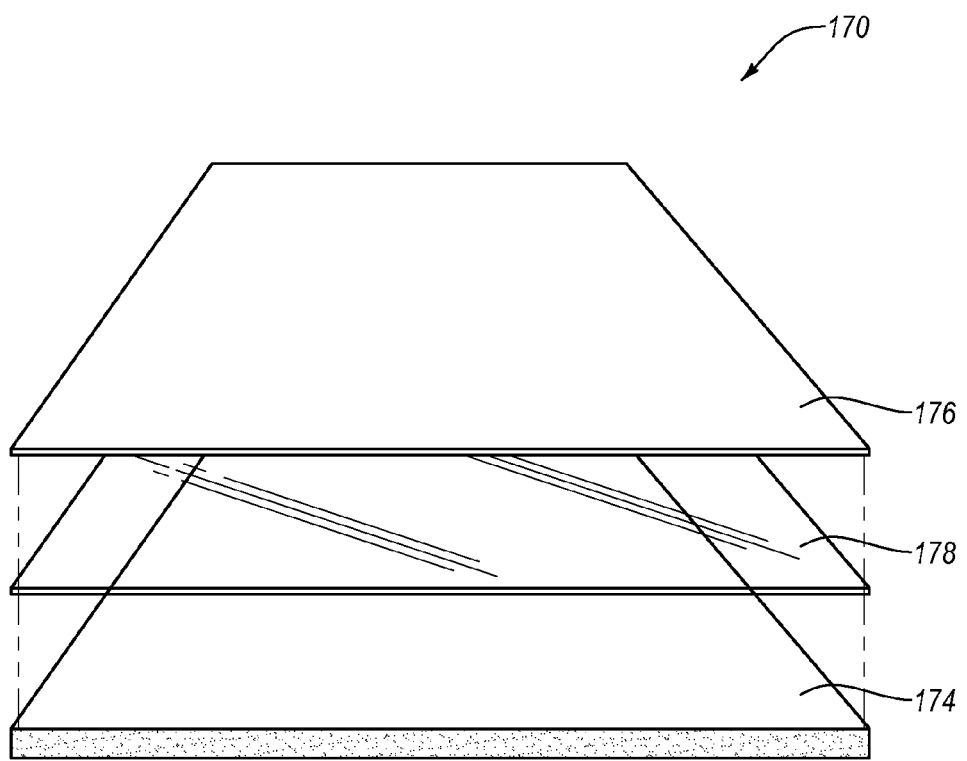
FIG. 9 is an exploded view of internal components for use in the lid module of the heating unit of FIG. 1.

For instance, FIG. 9 illustrates one exemplary embodiment of internal components 170 of lid 104. In the illustrated embodiment, internal components 170 include an insulation layer 174 and a heat spreading layer 176 attached together at attachment interface 178. Insulation layer 174 can limit or prevent heat generated by heating unit 100 from escaping from the interior space within heating element 100 to an environment external to heating unit 100. Heat spreading layer 176, as described above, can spread heat evenly over at least a portion of the surface of lid 104. Spreading heat over the interior surface of lid 104 can assist in evenly heating fluid system 108 and the fluid disposed therein. It will be appreciated that internal components 170 can include an insulation layer, a heat spreading element, a heat generating element, or any combination thereof.

In some embodiments, lid 104 may be additionally insulated for better heat retention. For example, lid 104 may include double, triple, or some other ratio of insulation material in insulation layer 174 as compared to wall module 102. As noted herein, lid 104 may include flaps 126. Flaps 126 can be secured to other portions of heating unit 100 or otherwise arranged to prevent or inhibit wind from entering heating unit 100 or heat from escaping heating unit 100. In one embodiment, flaps 126 extend about six inches over other sides of heating unit 100.

The embodiment shown in FIGS. 4 and 6 includes a 7-foot power cord 180 connected to the heat generating element 148. Other cord lengths may also be implemented within the scope of embodiments of the invention. The power cord may additionally be to an incoming electrical connector such as an AC power plug, bare wire connector, alligator clip connectors, a cigarette lighter plug connector or other appropriate connector for connecting the power cord to a source of power.

Notably, some embodiments may be implemented with interchangeable incoming electrical connectors. For example, embodiments may include a kit that includes a two-pin auto connector. The kit may further include a wire without an additional connector connected to a mating two pin auto connector, a set of alligator clips connected to a mating two pin auto connector, and a cigarette lighter plug connected to a mating two pin auto connector. A user can then select an appropriate incoming electrical connector. For example, a user may select the wire without an additional connector if the heating unit is to be hard wired to an electrical system, such as an automobile, boat, or other electrical system. Cigarette lighter plugs or alligator clip connectors could be selected for more temporary connectors.

Some embodiments may also include various fault protections. For example, embodiments may include an incoming electrical connector 152 which includes ground fault circuit interruption capabilities so as to make heating unit 100 suitable for use in wet or outdoor environment. Embodiments may include over current protection such as breakers or fuses. Embodiments may include arc fault circuit interruption capabilities to address problems related to fatigue of wires or crushing of wires.

Embodiments may further include provisions for grounding heating unit 100. For example, heating unit 100 is illustrated as including an incoming electrical connector 152 in the form an AC plug, which includes two power terminals and a grounding terminal. The power cord 180 may include three conductors, one connected to each power terminal of the incoming electrical conductor, and the third connected the grounding terminal. The two conductors connected each to a respective power terminal connect as described above to heat generating element 148. The third conductor may be connected so as to ground heating unit 100. This may be done, for example, by including an electrically conductive layer (not shown) in wall module 102 which is electrically connected to the grounding terminal.

In an alternative embodiment, due to the electrically conductive nature of heat spreading elements 150 when a graphite based material is used for heat spreading elements 150, the grounding terminal may be electrically coupled to heat spreading element 150. This may be accomplished in one example, by using a ground coupling in the form of a spade connector or other connector which passes through a protective layer of the heat spreading element so as to be in electrical contact with the conductive portions of heat spreading element 150. In one embodiment, the ground couplings comprise planar rectangular metal connection blades that would normally be used as the hot and/or neutral connection blades of a power coupling such as a power coupling which connects to a power source. In one embodiment, ground coupling spade connector further comprises barbs configured to cut into heat spreading element 150 and engage heat spreading element 150 such that the blade does not come loose. In alternative embodiments, the blade may be connected to heat spreading element 150 with an adhesive that does not electrically insulate heat spreading element 150 from the blade. In addition, the plane of the blade may be placed parallel to the plane of heat spreading element 150 such that a maximum amount of the surface area of the blade is in direct contact with heat spreading element 150. Such a configuration may increase the contact area between the two surfaces and results in a better electrical and physical connection. Furthermore, such a configuration can leverage the lower in-plane resistivity of heat-spreading element 150.

Additionally, some embodiments may include one or more outgoing electrical connector 154. This may be used, for example to allow chaining of modules and/or heating units together. In the example illustrated, the outgoing electrical connector 154 is connected electrically to the incoming electrical connector 152 through conductors passing through wall module 102. Other embodiments may allow the incoming electrical connector 152 and outgoing electrical connector 154 to be more or less proximate to each other as appropriate.

Grounding terminals of the outgoing electrical connector 154 may be electrically connected to the grounding terminals of the incoming electrical connector 152. This may be accomplished by wiring the terminals together or connecting both grounding connectors to the same grounding surface, such as a grounding layer, or to heat spreading element 150, as described above.

Some embodiments may further include timing circuitry such that a user can select when heating should occur. The timer may be an electronic controlled device supplied by the electrical connector 152 and may include internal switching such as relays or solid state switches for supplying power to heat generating element 150.

The modular nature of heating unit 100 facilitates ready assembly of heating unit 100. Wall module 102 can be relatively quickly set up and secured together with lid 104 placed thereon. Specifically, wall module 102 can be unfolded or unrolled and positioned around fluid system 108 and wall frame 106 quickly and easily. Opposing ends 136 and 138 of wall module 102 can then be secured together with fasteners 134 so that wall module 102 is secured around fluid system 108 and wall frame 106. Lid 104 can then be placed on and, optionally, secured to wall module 102 with fasteners 134.

Similarly, the modular nature of heating unit 100 facilitates the quick and ready disassembly of heating unit 100. In particular, fasteners 134 allow for wall module 102 and lid 104 to be quickly disconnected from one another. Once disconnected, lid 104 can be removed from wall module 102 and folded or rolled up for storage or transport. Likewise, wall module 102 can be removed from fluid system 108 by decoupling fasteners 134. Once disconnected, wall module 102 can be folded or rolled for storage or transport. The folded or rolled wall module 102 and lid 104 can then be stacked and stored or transported while taking up a relatively small amount of space. Being able to disassemble heating unit 100 when not in use or when being transported saves significant amounts of storage/cargo space, thus enabling additional heating units or other materials to be stored/transported.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for warming fluid in a fluid system, the fluid system having a fluid tank for storing fluid and a fluid dispensing system mounted to the fluid tank for dispensing fluid from the fluid tank, the method comprising:
    substantially surrounding the sides of the fluid tank and fluid dispensing system with a heating component, the heating component being configured to convert electrical energy to heat energy and to distribute the heat energy over the fluid tank and fluid dispensing system, the heating component comprising a heat generating element for converting electrical current to heat energy and a heat spreading element comprising carbon thermally coupled to the heat generating element, the heat spreading element being configured to draw the heat energy out of the heat generating element and substantially evenly distributes the heat energy over a substantial surface area of the heating component to substantially evenly distribute the heat energy over the fluid tank and fluid dispending system;
    substantially surrounding the sides of the fluid tank and fluid dispensing system with an insulation layer adapted to direct the heat energy from the heating component toward the fluid tank and fluid dispensing system; and substantially covering the fluid tank and fluid dispensing system with a lid having an insulation layer for retaining the heat energy under the lid.

2. The method of claim 1, further comprising selectively securing the heating component and the insulation layer around the fluid tank and fluid dispensing system.

3. The method of claim 1, wherein the insulation layers comprise closed cell foam.

4. The method of claim 1, further comprising providing a thermostat configured to regulate an operating temperature of the heating component.

5. A method for warming fluid in a fluid system, the fluid system having a fluid tank for storing fluid and a fluid dispensing system mounted to the fluid tank for dispensing fluid from the fluid tank, the method comprising:
- providing a heat wrap sized and configured to be selectively positioned about the fluid tank and the fluid dispensing system and configured to be selectively removed from about the fluid tank and the fluid dispensing system, the heat wrap comprising a heating component and an insulation layer;
- substantially surrounding the sides of the fluid tank and fluid dispensing system with the heat wrap, wherein substantially surrounding the sides of the fluid tank and fluid dispensing system with the heat wrap comprises:
- substantially surrounding the sides of the fluid tank and fluid dispensing system with the heating component, the heating component being configured to convert electrical energy to heat energy and to distribute the heat energy over the fluid tank and fluid dispensing system, the heating component comprising a heat generating element for converting electrical current to heat energy and a heat spreading element, the heat spreading element being configured to draw the heat energy out of the heat generating element and substantially evenly distributes the heat energy over a substantial surface area of the heating component to substantially evenly distribute the heat energy over the fluid tank and fluid dispending system;
- substantially surrounding the sides of the fluid tank and fluid dispensing system with the insulation layer, the insulation layer being adapted to direct the heat energy from the heating component toward the fluid tank and fluid dispensing system; and
- substantially covering the fluid tank and fluid dispensing system with a lid having an insulation layer for retaining the heat energy under the lid.

* * * * *